United States Patent
Ammari et al.

(10) Patent No.: US 11,809,342 B2
(45) Date of Patent: Nov. 7, 2023

(54) UNIVERSAL MECHANISM TO ACCESS AND CONTROL A COMPUTATIONAL DEVICE

(71) Applicant: Samsung Electronics Co., Ltd., Suwon-si (KR)

(72) Inventors: Ramzi Ammari, Santa Clara, CA (US); Changho Choi, San Jose, CA (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 17/482,412

(22) Filed: Sep. 22, 2021

(65) Prior Publication Data
US 2023/0024949 A1    Jan. 26, 2023

Related U.S. Application Data
(60) Provisional application No. 63/223,544, filed on Jul. 19, 2021.

(51) Int. Cl.
G06F 13/10    (2006.01)
G06F 13/16    (2006.01)

(52) U.S. Cl.
CPC ................ *G06F 13/1668* (2013.01)

(58) Field of Classification Search
CPC .. G06F 13/1668; G06F 3/0679; G06F 3/0688; G06F 3/0689; G06F 3/0685
See application file for complete search history.

(56) References Cited

U.S. PATENT DOCUMENTS

| | | | |
|---|---|---|---|
| 7,673,180 B1 | 3/2010 | Chen et al. |
| 8,055,816 B2 | 11/2011 | Asnaashari et al. |
| 8,209,704 B1 | 6/2012 | McCann et al. |
| 8,261,361 B2 | 9/2012 | Liu et al. |
| 8,271,557 B1 | 9/2012 | Lysaght et al. |
| 8,898,542 B2 | 11/2014 | Leggette et al. |
| 9,122,794 B2 | 9/2015 | Smiljanic et al. |
| 9,430,412 B2 | 8/2016 | Huang |
| 9,542,122 B2 | 1/2017 | Bohn et al. |
| 9,542,224 B2 | 1/2017 | Klee et al. |
| 9,632,848 B1 | 4/2017 | Oldcorn et al. |

(Continued)

FOREIGN PATENT DOCUMENTS

| CN | 112579254 A | 3/2021 |
|---|---|---|
| CN | 112905472 A | 6/2021 |

(Continued)

OTHER PUBLICATIONS

European Extended Search Report for Application No. 22209270.2, dated Mar. 23, 2023.

(Continued)

*Primary Examiner* — Cheng Yuan Tseng
(74) *Attorney, Agent, or Firm* — Renaissance IP Law Group LLP

(57) ABSTRACT

A storage device is disclosed. The storage device may include a storage for a data and a controller to process an input/output (I/O) request from a host processor on the data in the storage. A computational storage unit may implement at least one service for execution on the data in the storage. A command router may route a command received from the host processor to the controller or the computational storage unit based at least in part on the command.

20 Claims, 13 Drawing Sheets

(56) References Cited

U.S. PATENT DOCUMENTS

| | | |
|---|---|---|
| 9,690,615 B2 | 6/2017 | Dong et al. |
| 9,703,678 B2 | 7/2017 | Stall et al. |
| 10,157,143 B2 | 12/2018 | Xu et al. |
| 10,187,479 B2 | 1/2019 | Willmann |
| 10,261,912 B2 | 4/2019 | Coppola et al. |
| 10,372,376 B2 | 8/2019 | Singh et al. |
| 10,372,648 B2 | 8/2019 | Qiu |
| 10,466,903 B2 | 11/2019 | Benisty et al. |
| 10,534,546 B2 | 1/2020 | Benisty et al. |
| 10,565,142 B2 | 2/2020 | Jin et al. |
| 10,592,380 B2 | 3/2020 | Borello et al. |
| 10,642,496 B2 | 5/2020 | Benisty et al. |
| 10,678,432 B1 | 6/2020 | Dreier et al. |
| 10,678,677 B1 | 6/2020 | Kuris et al. |
| 10,705,952 B2 | 7/2020 | Kanaujia et al. |
| 10,705,974 B2 | 7/2020 | Qiu et al. |
| 10,740,217 B1 | 8/2020 | Stupachenko et al. |
| 10,756,816 B1* | 8/2020 | Dreier .................. H04L 49/357 |
| 10,769,050 B2 | 9/2020 | Peck et al. |
| 10,783,051 B2 | 9/2020 | Srinivasan et al. |
| 10,798,224 B2 | 10/2020 | Masputra et al. |
| 10,877,911 B1 | 12/2020 | Khan et al. |
| 10,901,624 B1 | 1/2021 | Benisty |
| 10,908,998 B2 | 2/2021 | Ding et al. |
| 10,915,381 B2* | 2/2021 | Costa .................. G06F 3/0664 |
| 10,915,426 B2 | 2/2021 | Douglas |
| 10,949,321 B1 | 3/2021 | Volpe et al. |
| 11,074,114 B1 | 7/2021 | Kostyushko et al. |
| 11,086,800 B2 | 8/2021 | Andrus et al. |
| 11,138,134 B2 | 10/2021 | Dracea et al. |
| 11,403,044 B2* | 8/2022 | Khan .................. G06F 9/34 |
| 11,442,733 B2* | 9/2022 | Jones .................. G06F 9/321 |
| 11,449,240 B1* | 9/2022 | Jadon .................. G06F 3/0656 |
| 11,467,987 B1* | 10/2022 | Jones .................. G06F 9/44594 |
| 11,487,471 B2* | 11/2022 | Greer .................. G06F 3/0604 |
| 11,507,298 B2* | 11/2022 | Yang .................. G06F 3/0679 |
| 11,507,301 B2* | 11/2022 | Norman .................. G11C 7/1039 |
| 11,561,909 B2* | 1/2023 | Hahn .................. G06F 13/161 |
| 2010/0005482 A1 | 1/2010 | Mukker et al. |
| 2012/0311117 A1 | 12/2012 | Fulop et al. |
| 2014/0351831 A1 | 11/2014 | Adda et al. |
| 2015/0261720 A1 | 9/2015 | Kagan et al. |
| 2016/0378545 A1 | 12/2016 | Ho |
| 2018/0285252 A1* | 10/2018 | Kwon .................. G06F 12/0848 |
| 2019/0205190 A1 | 7/2019 | Hebbal et al. |
| 2020/0034073 A1 | 1/2020 | Saha et al. |
| 2020/0127836 A1 | 4/2020 | Pappachan et al. |
| 2020/0201558 A1 | 6/2020 | Cho et al. |
| 2020/0293354 A1 | 9/2020 | Song et al. |
| 2020/0301898 A1* | 9/2020 | Samynathan ....... G06F 16/2453 |
| 2020/0341933 A1* | 10/2020 | Kachare .................. G06F 3/0661 |
| 2020/0343974 A1 | 10/2020 | Dreier |
| 2020/0379828 A1 | 12/2020 | Thorpe et al. |
| 2021/0011855 A1 | 1/2021 | Charan et al. |
| 2021/0019218 A1 | 1/2021 | Zhu et al. |
| 2021/0049036 A1 | 2/2021 | Poess et al. |
| 2021/0073116 A1 | 3/2021 | Rogers et al. |
| 2021/0117246 A1 | 4/2021 | Lal et al. |
| 2021/0150770 A1 | 5/2021 | Appu et al. |
| 2021/0208997 A1 | 7/2021 | Immonen |
| 2021/0255793 A1 | 8/2021 | Jaiyeoba et al. |
| 2021/0311641 A1 | 10/2021 | Prakashaiah et al. |
| 2022/0276803 A1* | 9/2022 | Yang .................. G06F 3/0683 |
| 2022/0300165 A1* | 9/2022 | Kerr .................. G06F 3/0613 |
| 2022/0300207 A1* | 9/2022 | Tsuji .................. G06F 3/0679 |
| 2022/0350604 A1* | 11/2022 | Jones .................. G06F 9/30101 |
| 2022/0365709 A1* | 11/2022 | Raghunath ............ G06F 3/0655 |

FOREIGN PATENT DOCUMENTS

| | | |
|---|---|---|
| CN | 113342590 A | 9/2021 |
| WO | 2015067983 A1 | 5/2015 |
| WO | 2018175059 A1 | 9/2018 |

OTHER PUBLICATIONS

Do, Jaeyoung et al., "Cost-Effective, Energy-Efficient, and Scalable Storage Computing for Large-scale AI Applications", ACM Transactions on Storage, Association for Computing Machinery, vol. 16, No. 4, Article 21, 2020, pp. 1-37.

European Extended Search Report for Application No. 22185404.5, dated Nov. 30, 2022.

Li, Hongwei et al., "Research of 'Stub' Remote Debugging Technique", 2009 4th International Conference on Computer Science & Education, 2009, pp. 990-994.

Lin, Tsung-Han et al., "Hardware-Assisted Reliability Enhancement for Embedded Multi-Core Virtualization Design", 2011 14th IEEE International Symposium on Object/Component/Service-Oriented Real-Time Distributed Computing, 2011, pp. 241-249.

Malone, Kim et al., "NVMe Computation Storage Standardizing Offload of Computation via NVMe", Storage Developer Conference, Virtual Conference, 2021, 24 pages.

Oh, Myonghoon et al., "Mitigating Journaling Overhead via Atomic Write," 2018 International Conference on Information and Communication Technology Convergence (ICTC), IEEE, pp. 539-542.

Torabzadehkashi, Mahdi et al: "Computational Storage: An Efficient and Scalable Platform for Big Data and HPC Applications", Journal of Big Data, vol. 6, No. 1, 2019, 29 pages.

Xuan, Chaoting et al., "Toward Revealing Kernel Malware Behavior in Virtual Execution Environments", International Workshop on Recent Advances in Intrusion Detection. Springer, Berlin, Heidelberg, 2009, 20 pages.

Yang, Ziye et al., "SPDK vhost-NVMe: Accelerating I/Os in Virtual Machines on NVMe SSDs via User Space vhost Target", 2018 IEEE 8th International Symposium on Cloud and Service Computing (SC2), 2018, pp. 67-76.

Akin, T. Allen et al., "A Prototype for an Advanced Command Language," ACM-SE 16: Proceedings of the 16th Annual Southeast Regional Conference, Apr. 1978, pp. 96-102.

Ellis, John R., "A Lisp Shell," Computer Science Department, Yale University, 1980, pp. 24-34.

European Extended Search Report for Application No. 23150871.4, dated Apr. 12, 2023.

Kernighan, Brian W. et al., "Software Tools," Bell Laboratories, 1976, 6 pages.

Lin, Jim-Min et al., "Integrating Existing Software Packages Using the Virtual Machine Technique", Journal of Systems and Software, vol. 18, Issue 3, Jul. 1992, pp. 207-218.

Meyer, Veronika et al., "The UNIX® Timesharing Operating System," Computer Physics Communications, vol. 50, Issues 1-2, Jul. 1988, pp. 51-57.

Morales-Velazquez, Luis et al., "Open-Architecture System Based on a Reconfigurable Hardware-Software Multi-Agent Platform for CNC Machines," Journal of Systems Architecture, vol. 56, Issue 9, Sep. 2010, pp. 407-418.

Smith, Terence R. et al., "Virtual Structures—A Technique for Supporting Scientific Database Applications," Entity-Relationship Approach—ER '94 Business Modelling and Re-Engineering, ER 1994, Lecture Notes in Computer Science, vol. 881, 1994, 22 pages.

Thomas, Mark A., "I/O Redirection and Pipes," Dec. 2019, retrieved from https://homepages.uc.edu/~thomam/Intro_Unix_Text/IO_Redir_Pipes.html Mar. 2023, 7 pages.

Thompson, T. J., "A Utilitarian Approach to CAD," 19th Design Automation Conference, IEEE, 1982, pp. 23-29.

Office Action for U.S. Appl. No. 17/583,179, dated Jun. 8, 2023.

\* cited by examiner

UNIVERSAL MECHANISM TO ACCESS AND CONTROL A COMPUTATIONAL DEVICE

RELATED APPLICATION DATA

This application claims the benefit of U.S. Provisional Patent Application Ser. No. 63/223,544, filed Jul. 19, 2021, which is incorporated by reference herein for all purposes.

FIELD

The disclosure relates generally to storage device, and more particularly to using capabilities of computational devices with storage devices through other protocols.

BACKGROUND

It is becoming more common for storage devices to include computational devices, which enhance the functionality of the storage device and support near-storage computing. However, interfaces to such storage devices may not support access to all of the features of the computational devices.

A need remains to provide access to all of the features of the computational device.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

SUMMARY

Figure 1:
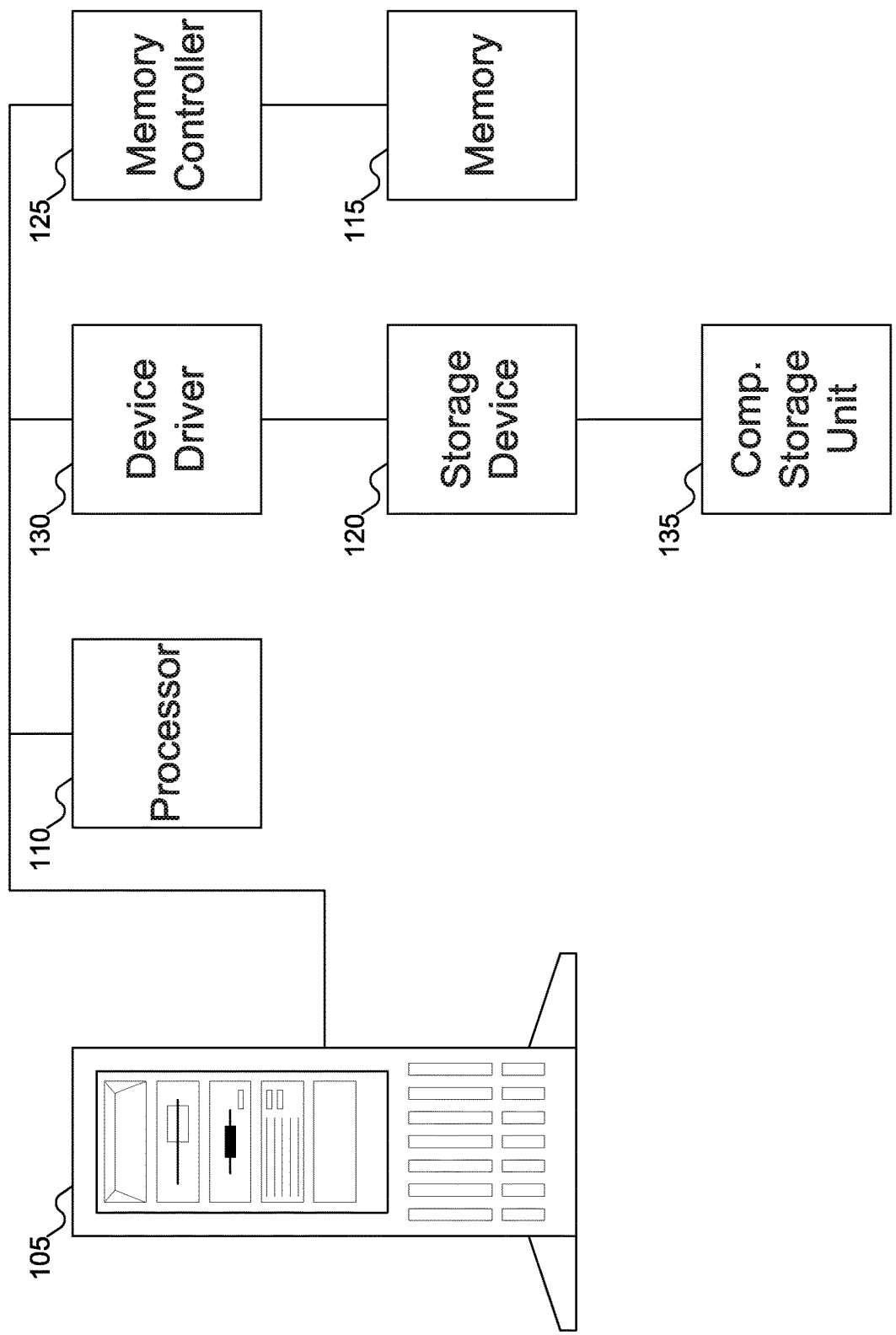
FIG. 1 shows a system including a computational storage unit that supports access to features of the computational storage device, according to embodiments of the disclosure.

Embodiments of the disclosure include the ability to route commands to a computational storage unit. When a command is received, a command router may determine whether the command is a command to be handled by a storage device or by the computational storage unit. The command may then be directed to either the storage device or the computational storage unit.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Storage devices continue to grow larger, storing more and more data. Moving all of that data from the storage device to main memory so that the processor may operate on the data may be an expensive process, both in terms of time and processor load.

To address these difficulties, storage devices may include computational devices. Computational devices may support near-storage processing, avoiding the time needed to move data from the storage device to main memory, and reducing the load on the processor so that other processes may be performed.

But as these computational devices become more advanced, the interface used to access these storage devices may limit access to the functions offered by the computational devices. For example, the Non-Volatile Memory Express (NVMe) specification may define how to communicate with a storage device, but not how to access functions offered by a computational device associated with the storage device.

Embodiments of the disclosure address these issues by adding a command parser/router to the storage device. This command parser/router may be an additional element, or it may be implemented as part of the controller of the storage device. The command parser/router may analyze an incoming command and determine whether that command is one that the storage device may process. If so, the command may be forwarded to the storage device; otherwise, the command may be sent to the computational device. In this manner, requests to access functions of the computational device may be supported. Such functions may include, for example: generating trace information; processor management (enabling/disabling processors; changing processor frequencies); and error correction. Such functions may be accessed using either new vendor-specific commands or by leveraging existing commands, such as a set feature command (and identifying features not implemented by the storage device).

FIG. 1 shows a system including a computational storage unit that supports access to features of the computational storage device, according to embodiments of the disclosure. In FIG. 1, machine 105, which may also be termed a host or a system, may include processor 110, memory 115, and storage device 120. Processor 110 may be any variety of processor. (Processor 110, along with the other components discussed below, are shown outside the machine for ease of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115 or storage device 120. Storage device 120 may be accessed using device driver 130.

Storage device 120 may be associated with computational storage unit 135. As discussed below with reference to FIGS. 3A-3D, computational storage unit 135 may be part of storage device 120, or it may be separate from storage device 120. The phrase "associated with" is intended to cover both a storage device that includes a computational storage unit and a storage device that is paired with a computational storage unit that is not part of the storage device itself. In other words, a storage device and a computational storage unit may be said to be "paired" when they are physically separate devices but are connected in a manner that enables them to communicate with each other.

In addition, the connection between storage device 120 and paired computational storage unit 135 might enable the two devices to communicate, but might not enable one (or both) devices to work with a different partner: that is, storage device 120 might not be able to communicate with another computational storage unit, and/or computational storage unit 135 might not be able to communicate with another storage device. For example, storage device 120 and paired computational storage unit 135 might be connected serially (in either order) to a fabric such as a bus, enabling computational storage unit 135 to access information from storage device 120 in a manner another computational storage unit might not be able to achieve.

Processor 110 and storage device 120 may be connected to a fabric. The fabric may be any fabric along which information may be passed. The fabric may include fabrics that may be internal to machine 105, and which may use interfaces such as Peripheral Component Interconnect Express (PCIe), Serial AT Attachment (SATA), Small Computer Systems Interface (SCSI), among others. The fabric may also include fabrics that may be external to machine 105, and which may use interfaces such as Ethernet, InfiniB and, or Fibre Channel, among others. In addition, the fabric may support one or more protocols, such as Non-Volatile Memory (NVM) Express (NVMe), NVMe over Fabrics (NVMe-oF), or Simple Service Discovery Protocol (SSDP), among others. Thus, the fabric may be thought of as encompassing both internal and external networking connections, over which commands may be sent, either directly or indirectly, to storage device 120 (and more particularly, the computational storage unit associated with storage device 120).

While FIG. 1 shows one storage device 120 and one computational storage unit 135, there may be any number (one or more) of storage devices, and/or any number (one or more) of computational storage units in machine 105.

While FIG. 1 uses the generic term "storage device", embodiments of the disclosure may include any storage device formats that may benefit from the use of computational storage units, examples of which may include hard disk drives and Solid State Drives (SSDs). Any reference to "SSD" below should be understood to include such other embodiments of the disclosure. In addition, while the discussion above (and below) focuses on storage device 120 as being associated with a computational storage unit, embodiments of the disclosure may extend to devices other than storage devices that may include or be associated with a computational storage unit. Any reference to "storage device" above (and below) may be understood as also encompassing other devices that might be associated with a computational storage unit.

Figure 2:
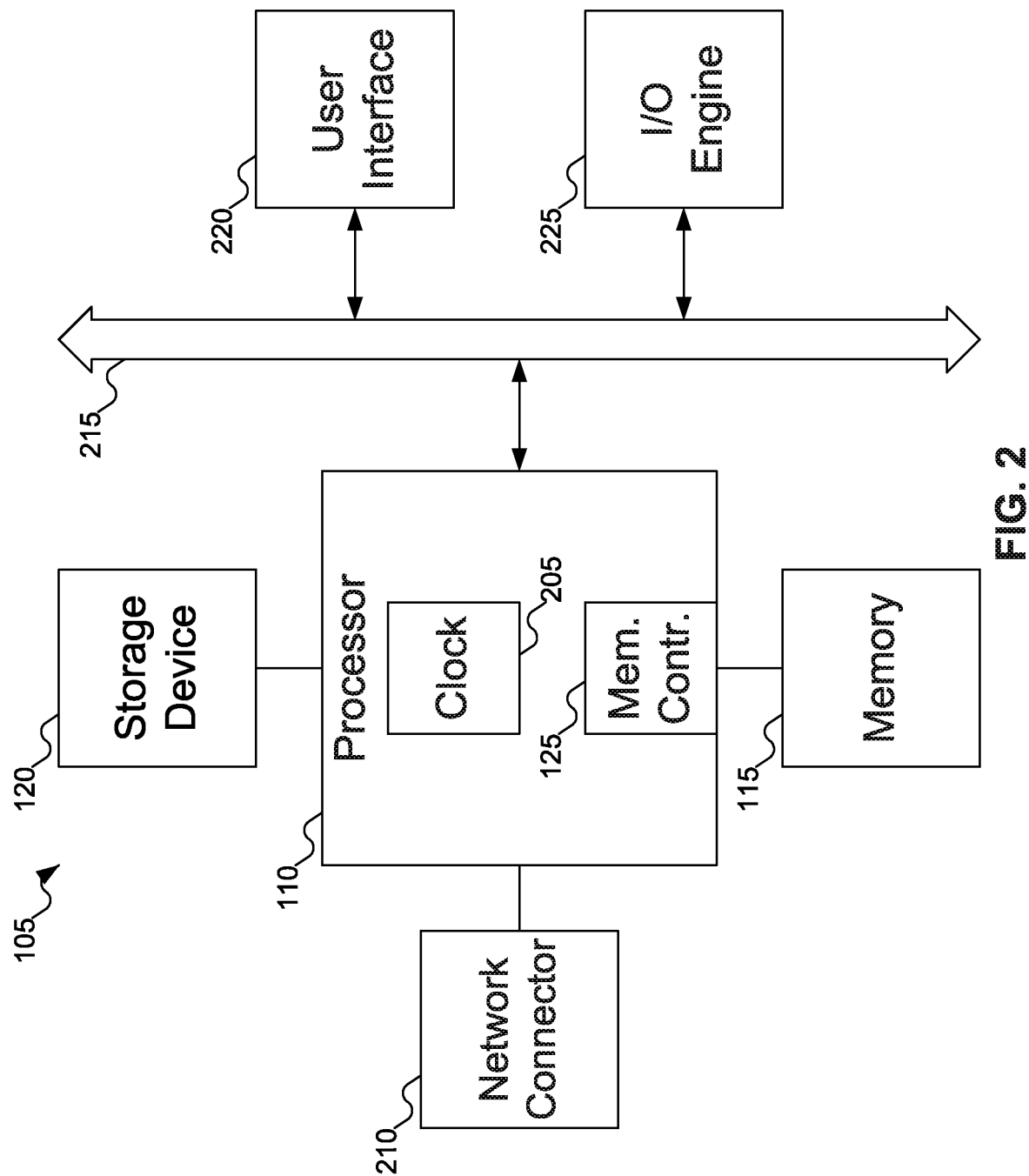
FIG. 2 shows details of the machine of FIG. 1, according to embodiments of the disclosure.

FIG. 2 shows details of machine 105 of FIG. 1, according to embodiments of the disclosure. In FIG. 2, typically, machine 105 includes one or more processors 110, which may include memory controllers 120 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 125, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3A:
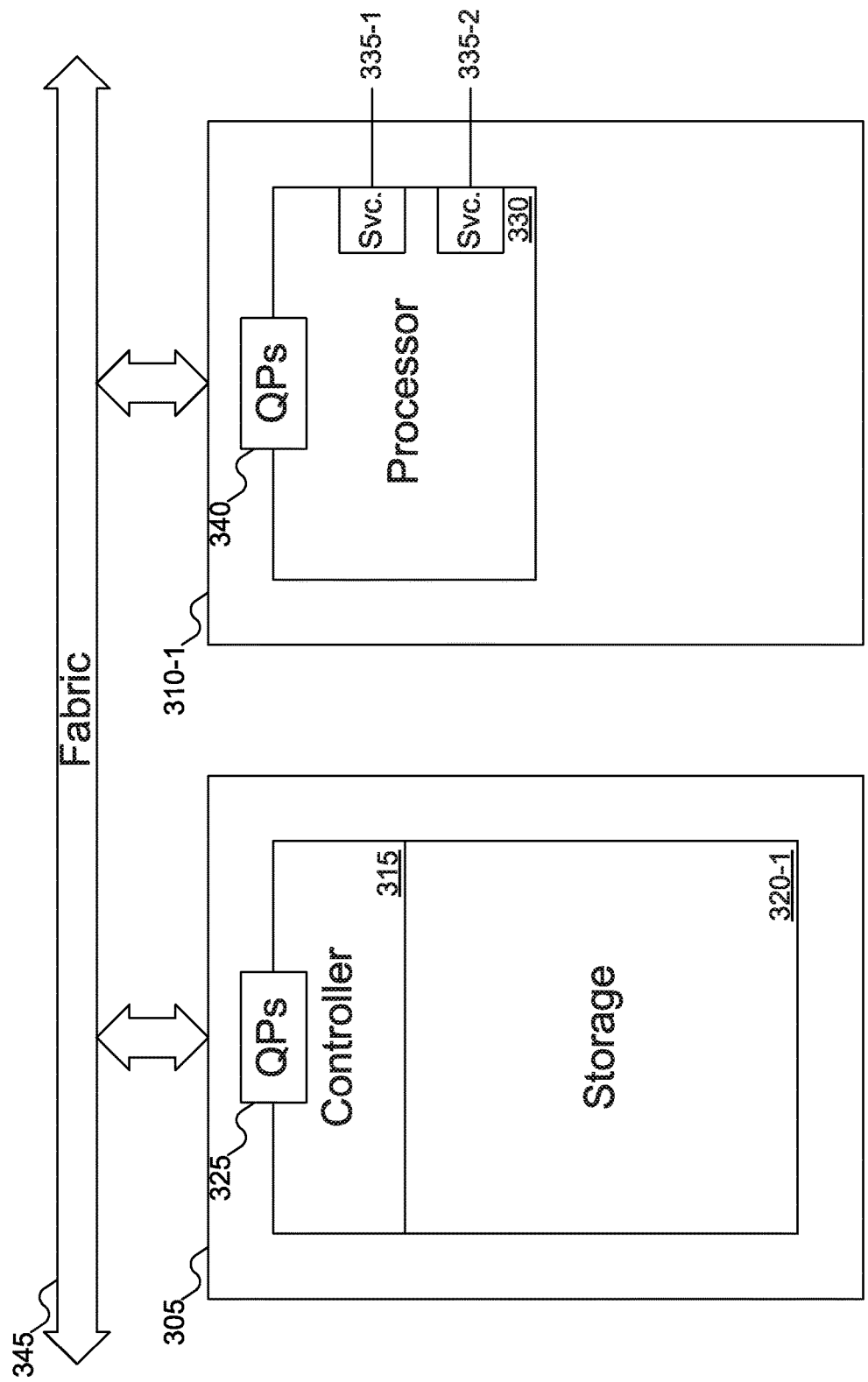
FIG. 3A shows a first example arrangement of a computational storage unit that may be associated with the storage device of FIG. 1, according to embodiments of the disclosure.

FIGS. 3A-3D show various arrangements of computational storage unit 135 of FIG. 1 (which may also be termed a "computational device" or "device") that may be associated with storage device 120 of FIG. 1, according to embodiments of the disclosure. In FIG. 3A, storage device 305 and computational device 310-1 are shown. Storage device 305 may include controller 315 and storage 320-1, and may be reachable across queue pairs: queue pairs 325 may be used both for management of storage device 305 and to control I/O of storage device 305.

Computational device 310-1 may be paired with storage device 305. Computational device 310-1 may include any number (one or more) processors 330, which may offer one or more services 335-1 and 335-2. To be clearer, each processor 330 may offer any number (one or more) services 335-1 and 335-2 (although embodiments of the disclosure may include computational device 310-1 including exactly two services 335-1 and 335-2). Each processor 330 may be a single core processor or a multi-core processor. Computational device 310-1 may be reachable across queue pairs 340, which may be used for both management of computational device 310-1 and/or to control I/O of computational device 310-1

Processor(s) 330 may be thought of as near-storage processing: that is, processing that is closer to storage device 305 than processor 110 of FIG. 1. Because processor(s) 330 are closer to storage device 305, processor(s) 330 may be able to execute commands on data stored in storage device 305 more quickly than for processor 110 of FIG. 1 to execute such commands. While not shown in FIG. 3A, processor(s) 330 may have associated memory which may be used for local execution of commands on data stored in storage device 305. This associated memory may include local memory similar to memory 115 of FIG. 1, on-chip memory (which may be faster than memory such as memory 115, but perhaps more expensive to produce), or both.

While FIG. 3A shows storage device 305 and computational device 310-1 as being separately reachable across fabric 345, embodiments of the disclosure may also include storage device 305 and computational device 310-1 being serially connected (as shown in FIG. 1). That is, commands directed to storage device 305 and computational device 310-1 might both be received at the same physical connection to fabric 345 and may pass through one device to reach the other. For example, if computational device 310-1 is located between storage device 305 and fabric 345, computational device 310-1 may receive commands directed to both computational device 310-1 and storage device 305: computational device 310-1 may process commands directed to computational device 310-1, and may pass commands directed to storage device 305 to storage device 305. Similarly, if storage device 305 is located between computational device 310-1 and fabric 345, storage device 305 may receive commands directed to both storage device 305 and computational device 310-1: storage device 305 may process commands directed to storage device 305 and may pass commands directed to computational device 310-1 to computational device 310-1.

Services 335-1 and 335-2 may offer a number of different functions that may be executed on data stored in storage device 305. For example, services 335-1 and 335-2 may offer pre-defined functions, such as encryption, decryption, compression, and/or decompression of data, erasure coding, and/or applying regular expressions. Or, services 335-1 and 335-2 may offer more general functions, such as data searching and/or SQL functions. Services 335-1 and 335-2 may also support running application-specific code. That is, the application using services 335-1 and 335-2 may provide custom code to be executed using data on storage device 305. Services 335-1 and 335-2 may also any combination of such functions. Table 1 lists some examples of services that may be offered by processor(s) 330.

TABLE 1

| Service Types |
|---|
| Compression |
| Encryption |
| Database filter |
| Erasure coding |
| RAID |
| Hash/CRC |
| RegEx (pattern matching) |
| Scatter Gather |
| Pipeline |
| Video compression |
| Data deduplication |
| Operating System Image Loader |
| Container Image Loader |
| Berkeley packet filter (BPF) loader |
| FPGA Bitstream loader |
| Large Data Set |

Processor(s) 330 (and, indeed, computational device 310-1) may be implemented in any desired manner. Example implementations may include a local processor, such as Central Processing Unit (CPU) or some other processor, a Graphics Processing Unit (GPU), a General Purpose GPU (GPGPU), a Data Processing Unit (DPU), a Tensor Processing Unit (TPU), and a Neural Processing Unit (NPU), among other possibilities. Processor(s) 330 may also be implemented using a Field Programmable Gate Array (FPGA) or an Application-Specific Integrated Circuit (ASIC), among other possibilities. If computational device 310-1 includes more than one processor 330, each processor may be implemented as described above. For example, computational device 310-1 might have one each of CPU, TPU, and FPGA, or computational device 310-1 might have two FPGAs, or computational device 310-1 might have two CPUs and one ASIC, etc.

Depending on the desired interpretation, either computational device 310-1 or processor(s) 330 may be thought of as a computational storage unit.

Figure 3B:
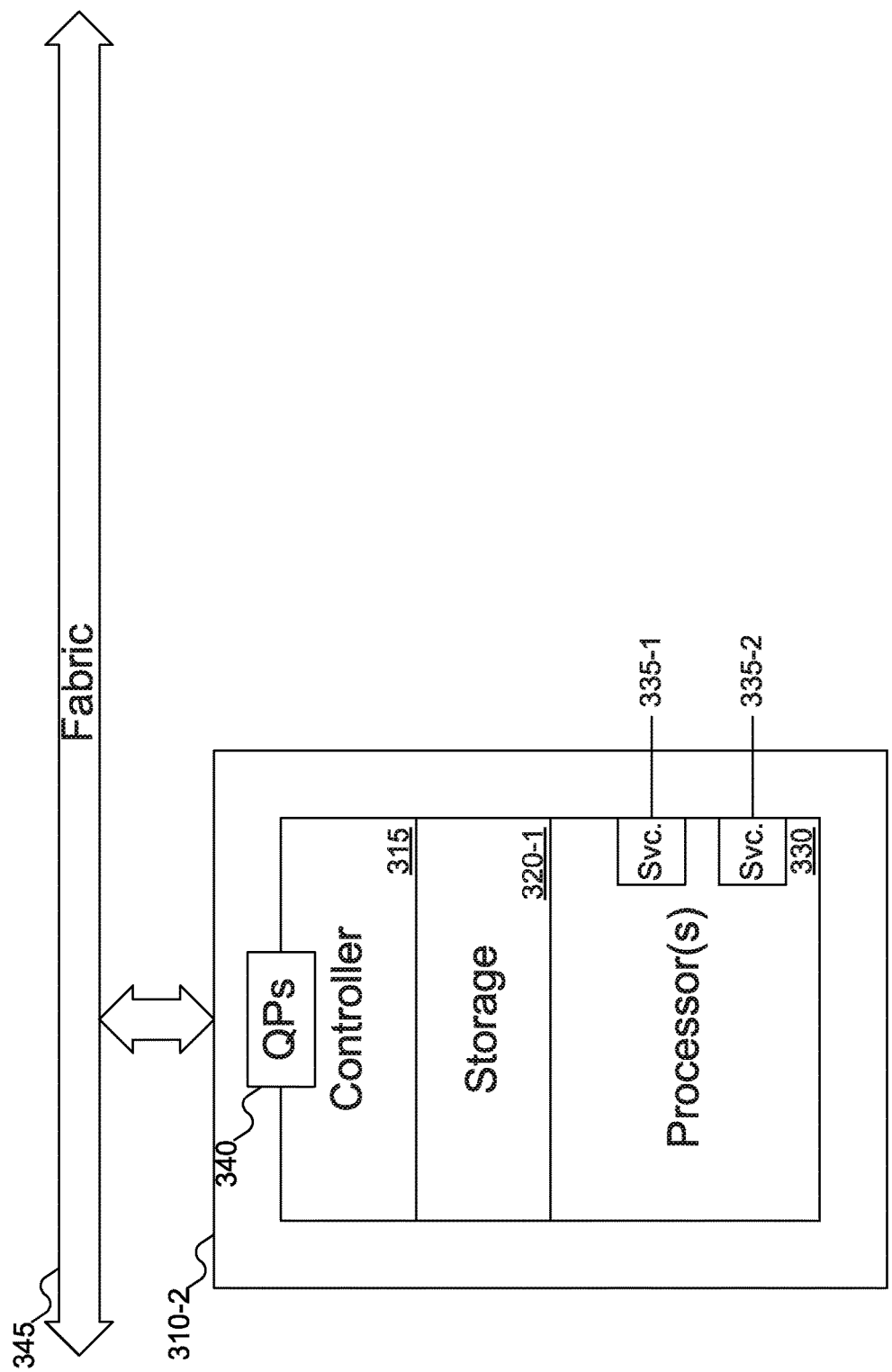
FIG. 3B shows a second example arrangement of a computational storage unit that may be associated with the storage device of FIG. 1, according to embodiments of the disclosure.

Whereas FIG. 3A shows storage device 305 and computational device 310-1 as separate devices, in FIG. 3B they may be combined. Thus, computational device 310-2 may include controller 315, storage 320-1, and processor(s) 330 offering services 335-1 and 335-2. As with storage device 305 and computational device 310-1 of FIG. 3A, management and I/O commands may be received via queue pairs 340. Even though computational device 310-2 is shown as including both storage and processor(s) 330, FIG. 3B may still be thought of as including a storage device that is associated with a computational storage unit.

Figure 3C:
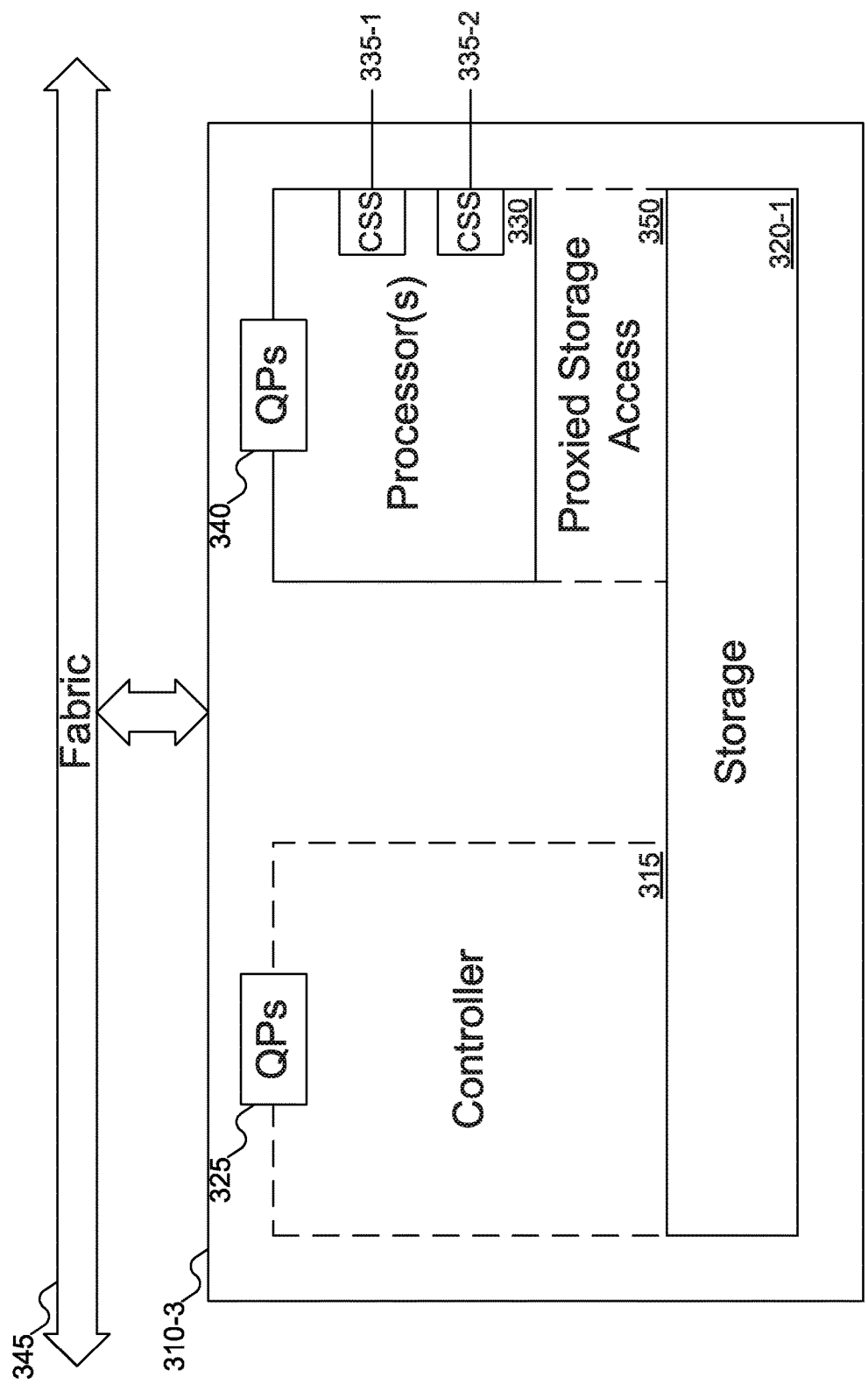
FIG. 3C shows a third example arrangement of a computational storage unit that may be associated with the storage device of FIG. 1, according to embodiments of the disclosure.

In yet another variation shown in FIG. 3C, computational device 310-3 is shown. Computational device 310-3 may include controller 315 and storage 320-1, as well as processor(s) 330 offering services 335-1 and 335-2. But even though computational device 310-3 may be thought of as a single component including controller 315, storage 320-1, and processor(s) 330 (and also being thought of as a storage device associated with a computational storage unit), unlike the implementation shown in FIG. 3B controller 315 and processor(s) 330 may each include their own queue pairs 325 and 340 (again, which may be used for management and/or I/O). By including queue pairs 325, controller 315 may offer transparent access to storage 320-1 (rather than requiring all communication to proceed through processor(s) 330).

In addition, processor(s) 330 may have proxied storage access 350 to storage 320-1. Thus, instead of routing access requests through controller 315, processor(s) 330 may be able to directly access the data from storage 320-1.

In FIG. 3C, both controller 315 and proxied storage access 350 are shown with dashed lines to represent that they are optional elements, and may be omitted depending on the implementation.

Figure 3D:
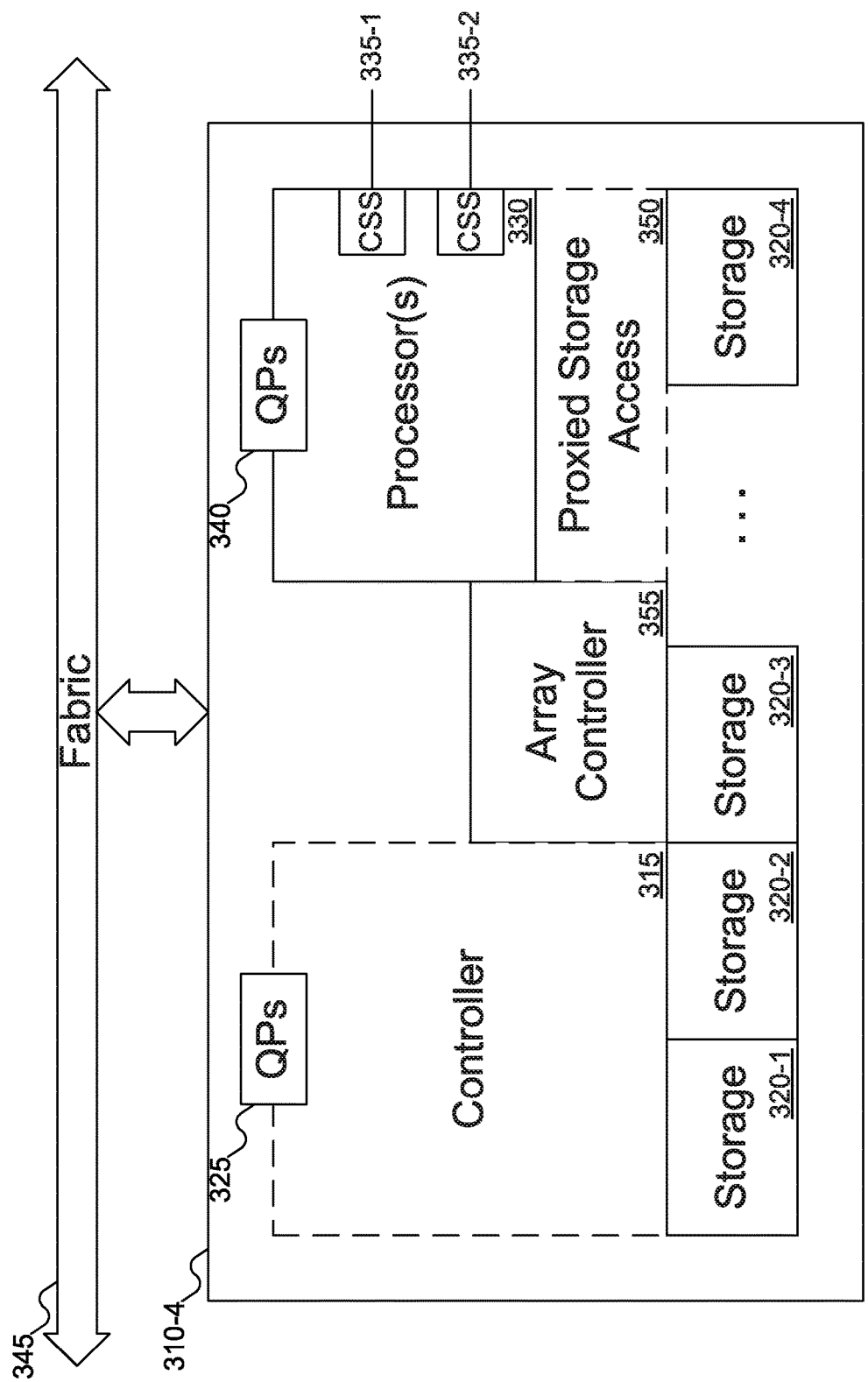
FIG. 3D shows a fourth example arrangement of a computational storage unit that may be associated with the storage device of FIG. 1, according to embodiments of the disclosure.

Finally, FIG. 3D shows yet another implementation. In FIG. 3D, computational device 310-4 is shown, which may include controller 315 and proxied storage access 350 similar to FIG. 3C. In addition, computational device 310-4 may include an array of one or more storage 320-1 through 320-4. While FIG. 3D shows four storage elements, embodiments of the disclosure may include any number (one or more) of storage elements. In addition, the individual storage elements may be other storage devices, such as those shown in FIGS. 3A-3D.

Because computational device 310-4 may include more than one storage element 320-1 through 320-4, computational device 310-4 may include array controller 355. Array controller 355 may manage how data is stored on and retrieved from storage elements 320-1 through 320-4. For example, if storage elements 320-1 through 320-4 are implemented as some level of a Redundant Array of Independent Disks (RAID), array controller 355 may be a RAID controller. If storage elements 320-1 through 320-4 are implemented using some form of Erasure Coding, then array controller 355 may be an Erasure Coding controller.

Figure 4A:
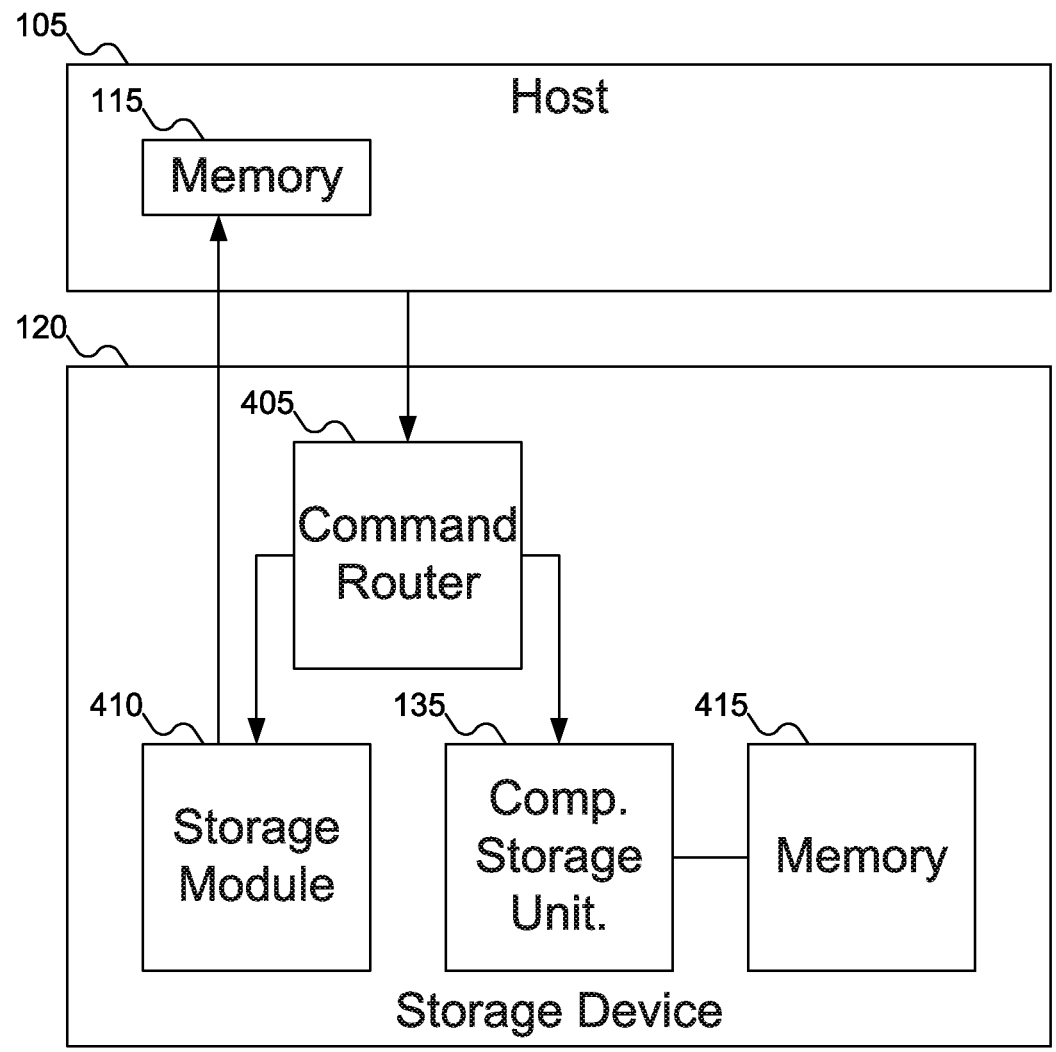
FIG. 4A shows a first arrangement of the storage device of FIG. 1 to route commands to the computational storage unit of FIG. 1, according to embodiments of the disclosure.

FIG. 4A shows a first arrangement of storage device 120 of FIG. 1 to route commands to computational storage unit 135 of FIG. 1, according to embodiments of the disclosure. In FIG. 4A, host 105 may issue commands that may be sent to storage device 120. Storage device 120 may then include command router 405. Command router 405 may receive the command, examine the command, and determine whether the command is a storage command or a computational storage unit command. If the command is a storage command, then command router 405 may route the command to storage module 410 (which may be, for example, a controller within storage device 120), which may then process the storage command. Alternatively, if the command is a computational storage unit command, then command router 405 may route the command to computational storage unit 135, which may then process the computational storage unit command (possibly using memory 415). For example, the computational storage unit command may be a command to execute a service such as services 335-1 and/or 335-2 of FIGS. 3A-3D; or the computational storage unit command may be a command to load byte code or a program that may then be executed; or the computational storage unit command may be a command to execute a trace on a program running on computational storage unit 135. In short, the computational storage unit command may be any command that might be sent to computational storage unit 135, regardless of whether computational storage unit 135 is "behind" storage device 120 (in the sense that storage device 120 may receive the command and determine how to handle the command before it is delivered to computational storage unit 135).

As for how command router 405 may know whether a particular command is a storage command or a computational storage unit command, command router 405 may examine the command itself. If the command is recognized as being a storage command, then the command may be routed to storage module 410; otherwise, the command may be routed to computational storage unit 135. Alternatively, if the command is recognized as a computational storage unit command, the command may be routed to computational storage unit 135; otherwise, the command may be routed to storage module 410.

As an example, consider Table 2, which lists various NVMe features. These features may be defined for use by a storage device.

TABLE 2

| | | NVMe Feature List | |
|---|---|---|---|
| Feature Identifier | Current Setting Persists Across Power Cycle and Reset | Uses Memory Buffer for Attributes | Feature Name |
| 00h | | | Reserved |
| 01h | No | No | Arbitration |
| 02h | No | No | Power Management |
| 03h | Yes | Yes | LBA Range Type |
| 04h | No | No | Temperature Threshold |
| 05h | No | No | Error Recovery |
| 06h | No | No | Volatile Write Cache |
| 07h | No | No | Number of Queues |
| 08h | No | No | Interrupt Coalescing |
| 09h | No | No | Interrupt Vector Configuration |
| 0Ah | No | No | Write Atomicity Normal |
| 0Bh | No | No | Asynchronous Event Configuration |
| 0Ch | No | Yes | Autonomous Power State Transition |
| 0Dh | No | No | Host Memory Buffer |
| 0Eh | No | Yes | Timestamp |

TABLE 2-continued

NVMe Feature List

| Feature Identifier | Current Setting Persists Across Power Cycle and Reset | Uses Memory Buffer for Attributes | Feature Name |
|---|---|---|---|
| 0Fh | No | No | Keep Alive Timer |
| 10h | Yes | No | Host Controlled Thermal Management |
| 11h | No | No | Non-Operational Power Level Config |
| 12h | Yes | No | Read Recovery Level Config |
| 13h | No | Yes | Predictable Latency Mode Config |
| 14h | No | No | Predictable Latency Mode Window |
| 15h | No | No | LBA Status Information Report Interval |
| 16h | No | Yes | Host Behavior Support |
| 17h | Yes | No | Sanitize Config |
| 18h | No | No | Endurance Group Event Configuration |
| 19h to 77h | | | Reserved |
| 78h to 7Fh | Refer to the NVMe Management Interface Specification for definition | | |
| 80h to BFh | | | Command Set Specific (Reserved) |

Note that features 19h to 77h are reserved. That means that these features are not currently defined for use by a storage device Normally, if a command were to list a feature identified as 19h to 77h, the storage device may return an error, being unable to determine what to do with such a command. But such feature identifiers may be used for commands to be sent to computational storage unit 135. For example, feature 19h may be used to instruct computational storage unit 135 to perform tracing on a portion of code. Command router 405, upon seeing a command using such a feature identifier, may determine that the command is a computational storage unit command and may route the command to computational storage unit 135, rather than to storage module 410. Other feature identifiers, not currently used for storage commands, may be similarly used to manage other features of computational storage unit 135.

While the above example focuses on recognizing commands that are storage commands, and routing any other commands to computational storage unit 135, embodiments of the disclosure may work in reverse. That is, embodiments of the disclosure may recognize commands that are intended for computational storage unit 135, and may direct any commands that are not recognized to storage module 410 instead. Embodiments of the disclosure may also combine both approaches, recognizing commands that are storage commands and commands that are computational storage unit commands, and routing each appropriately; any commands that are not recognized as either storage commands or computational storage unit commands may result in an error being returned.

The fact that command router 405 may determine where to route a command does not guarantee that the command will be successfully processed. For example, command router 405 might determine that a particular command is not a storage command, and may route the command to computational storage unit 135. But if computational storage unit 135 may not recognize the command, computational storage unit 135 may return an error.

In addition, command router 405 may perform translation. For example, as described above with reference to Table 2: NVMe Feature List, commands intended for computational storage unit 135 may be sent as storage commands but using particular features that are not currently used by storage device 120. Command router 405 may be responsible for translating the storage-formatted command received by command router 405 into a format that may be processed by computational storage unit 135. (Command router 405 may also translate commands into a format that may be processed by storage device 120, if the command is not formatted as a storage command. But typically, commands may be formatted as storage commands, which may be processed by storage device 120 without translation.)

In FIG. 4A, computational storage unit 135 is shown as part of storage device 120. But in some embodiments of the disclosure, computational storage unit 135 may be separate from storage device 120 (as discussed, for example, with reference to FIG. 3A above).

Figure 4B:
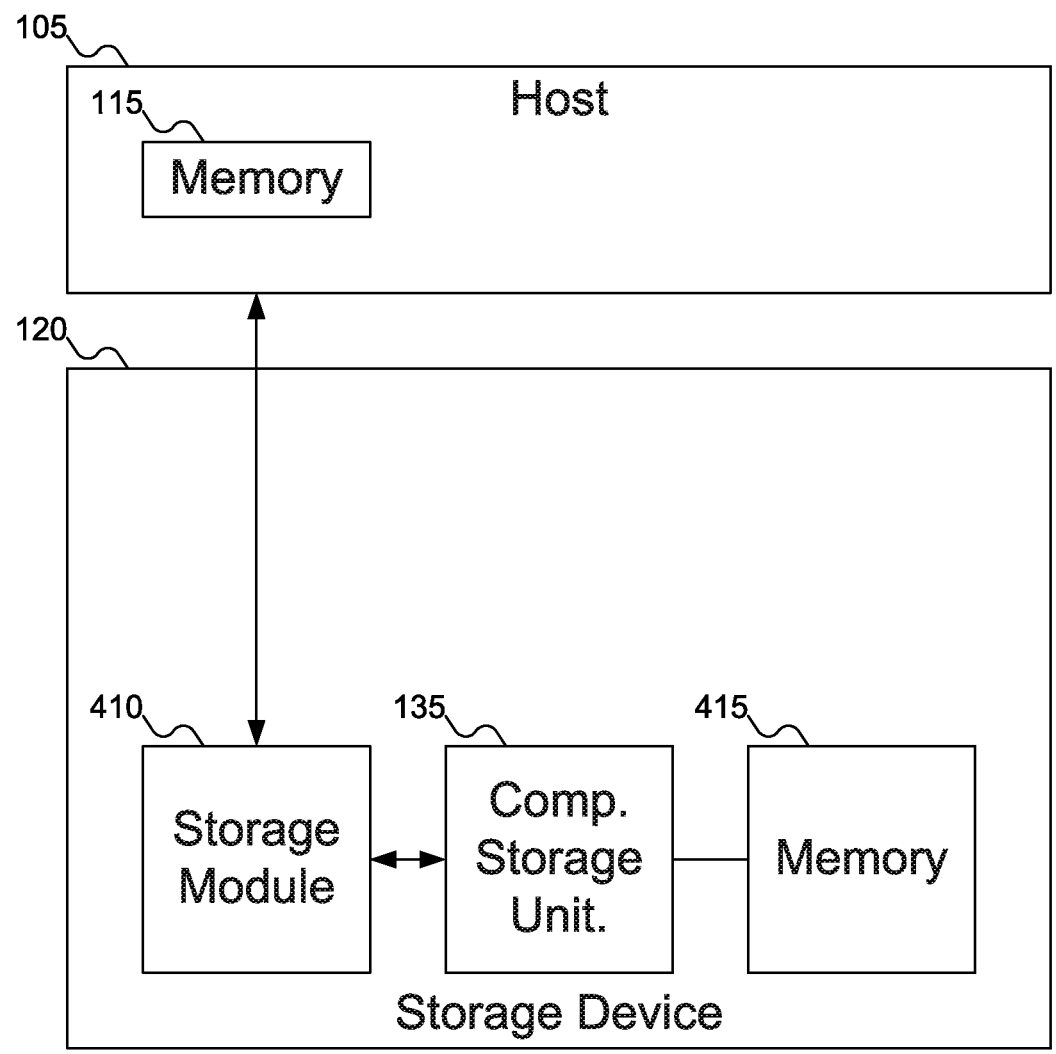
FIG. 4B shows a second arrangement of the storage device of FIG. 1 to route commands to the computational storage unit of FIG. 1, according to embodiments of the disclosure.

FIG. 4B shows a second arrangement of the storage device of FIG. 1 to route commands to computational storage unit 135 of FIG. 1, according to embodiments of the disclosure. The difference between FIGS. 4A and 4B is that in FIG. 4B command router 135 may be omitted. Instead, storage module 410 (which, again, may be a controller in storage device 120) may examine commands as received, and any command not recognized as a storage command may be routed to computational storage unit 135. Note that embodiments of the disclosure may operate in reverse here as well: the command could be examined by computational storage unit 135 first, and any commands that are storage commands may then be routed to storage module 410. In the embodiments of the disclosure shown in FIG. 4B, storage module 410 may implement the processing of command router 405 of FIG. 4A in any desired manner, either as a component (such as a circuit) within storage module 410, or by using appropriate firmware or software running on a processor or other circuit in storage module 410.

As described above, command router 405 of FIG. 4A (and storage module 410 of FIG. 4B, when storage module 410 of FIG. 4B implements the logic of command router 405 of FIG. 4A) may examine a command to determine if the command is a command to be processed by storage module 410 or computational storage unit 135. But in some embodiments of the disclosure, storage module 410 may receive all commands, and may process what commands storage module 410 may recognize, and any unrecognized commands may then be sent to computational storage unit 135. Such embodiments of the disclosure may be used with or without command router 405 of FIG. 4A. For example, command router 405 of FIG. 4A may route all commands initially to storage module 410; upon receiving an error result from storage module 410, command router 405 of FIG. 4A may then route the command to computational storage unit 135 for computational storage unit 135 to attempt to process the command. In such embodiments of the disclosure, command router 405 of FIG. 4A may include some storage to buffer a command until storage module 410 processes (successfully or unsuccessfully) the command.

As discussed above, in FIG. 4A, command router 405 of FIG. 4A may simply route a command to either storage module 410 or to computational storage unit 135. Command router 405 of FIG. 4A may not be responsible to translating the command into a format that may be executed by computational storage unit 135. It may be up to computational storage unit 135 to interpret the received command, including any translation into instruction/instructions that may be executed by computational storage unit 135. (Since commands intended for storage module 410 may already be in a form recognized by storage module 410, command router 405 of FIG. 4A may not be responsible for translating storage commands routed to storage module 410 either.) But in some embodiments of the disclosure, command router 405 of FIG. 4A may also perform translation of commands routed to computational storage unit 135. The same may be said of storage module 410 of FIG. 4B when storage module 410 of FIG. 4B implements the logic of command router 405 of FIG. 4A.

Figure 5:
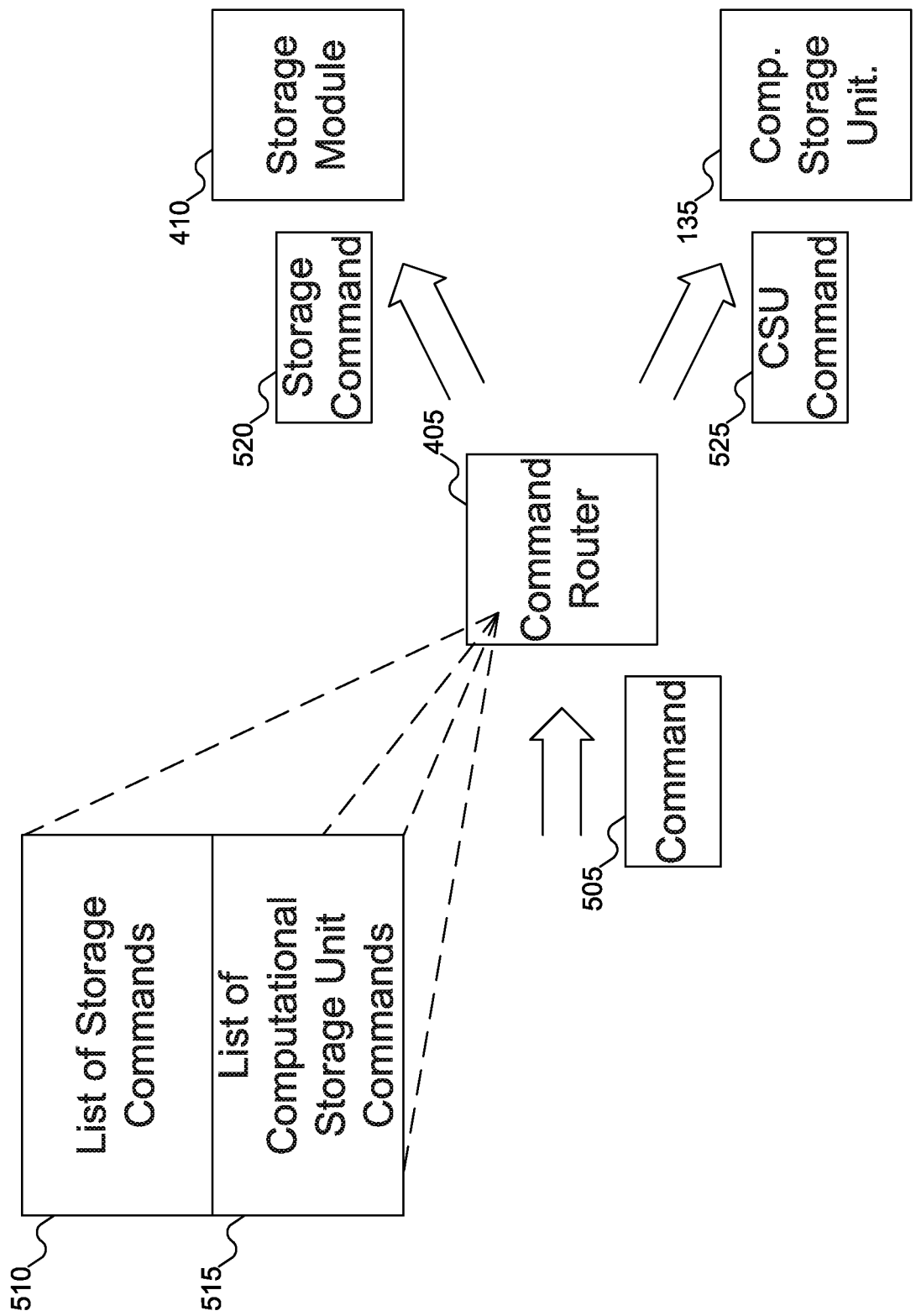
FIG. 5 shows the command router of FIG. 4A configured to route commands to the computational storage unit of FIG. 1, according to embodiments of the disclosure.

FIG. 5 shows command router 405 of FIG. 4A configured to route commands to computational storage unit 135 of FIG. 1, according to embodiments of the disclosure. In FIG. 5, command router 405 may receive command 505. By comparing command 505 with list of storage commands 510 and/or list of computational storage unit commands 515, command router 405 may determine if command 505 is storage command 520 or computational storage unit command 525, and may route command 505 to storage module 410 or computational storage unit 135, respectively. List of storage commands 510 and/or list of computational storage unit commands 515 may be stored in some storage (volatile or non-volatile) in command router 405, and may be updated as desired: for example, list of storage commands 510 and/or list of computational storage unit commands 515 may be updated upon power-up of command router 405 or when command router 405 receives a signal from an external source to update list of storage commands 510 and/or list of computational storage unit commands 515.

The above description uses list of storage commands 510 and/or list of computational storage unit commands 515 to determine whether command 505 is storage command 520 or computational storage unit command 525. For example, list of storage commands 510 may include the NVMe set feature command, with associated information about the features used for storage devices (as described above in Table 2). Any command that is not in list of storage commands 510 (or uses a feature not described in list of storage commands 510) may then be understood to be a computational storage unit command. Commands associated with other protocols than NVMe may also be used: for example, a cache-coherent interconnect protocol, such as the Compute Express Link® (CXL) protocol, or PCIe protocol. (Compute Express Link is a registered trademark of the Compute Express Link Consortium, Inc.) But embodiments of the disclosure may also rely on other mechanisms to determine whether command 505 is storage command 520 or computational storage unit command 525. For example, command 505 may include a tag (perhaps as part of the command itself, or perhaps as command metadata, such as a packet header or other packet information) identifying command 505 as storage command 520 or computational storage unit command 525. Or storage command 520 and computational storage unit command 525 may use different protocols, or different command structures, or be in some way distinguishable without comparing command 505 with list of storage commands 510 and/or list of computational storage unit commands 515. Or computational storage unit 135 may use a vendor-specific command.

While the above discussion describes command router 405 as using "list" of storage commands 510 and list of computational storage commands 515, embodiments of the disclosure may use any data structure to store information about storage commands 520 and/or computational storage unit commands 525. For example, "lists" 510 and 515 may be stored as arrays, linked lists, hash tables, or any other desired data structures to represent which commands are storage commands 520 and which commands are computational storage unit commands 525.

Figure 6:
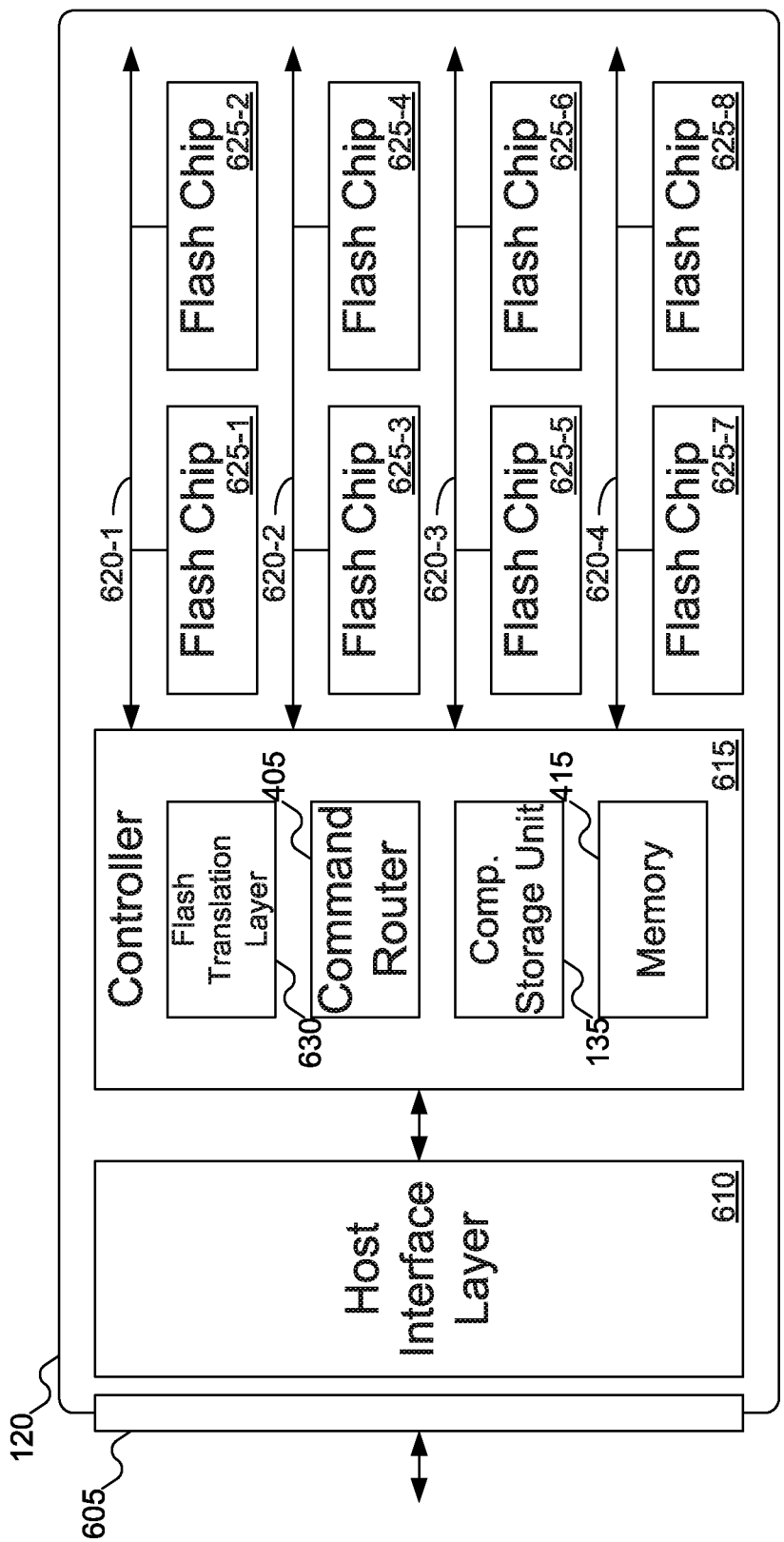
FIG. 6 shows a Solid State Drive (SSD) supporting routing commands to the computational storage unit of FIG. 1, according to embodiments of the disclosure.

FIG. 6 shows a Solid State Drive (SSD) supporting routing commands to computational storage unit 135 of FIG. 1, according to embodiments of the disclosure. In FIG. 6, SSD 120 may include interface 605. Interface 605 may be an interface used to connect SSD 120 to machine 105 of FIG. 1, and may receive I/O requests, such as read requests and write requests, from processor 110 of FIG. 1 (or other request sources). SSD 120 may include more than one interface 605: for example, one interface might be used for block-based read and write requests, and another interface might be used for key-value read and write requests. While FIG. 6 suggests that interface 605 is a physical connection between SSD 120 and machine 105 of FIG. 1, interface 605 may also represent protocol differences that may be used across a common physical interface. For example, SSD 120 might be connected to machine 105 using a U.2 or an M.2 connector, but may support block-based requests and key-value requests: handling the different types of requests may be performed by a different interface 605.

SSD 120 may also include host interface layer 610, which may manage interface 605. If SSD 120 includes more than one interface 605, a single host interface layer 610 may manage all interfaces, SSD 120 may include a host interface layer for each interface, or some combination thereof may be used.

SSD 120 may also include SSD controller 615, various channels 620-1, 620-2, 620-3, and 620-4, along which various flash memory chips 625-1, 625-2, 625-3, 625-4, 625-5, 625-6, 625-7, and 625-8 may be arrayed (flash memory chips 625-1 through 625-8 may be referred to collectively as flash memory chips 625). SSD controller 615 may manage sending read requests and write requests to flash memory chips 625-1 through 625-8 along channels 620-1 through 620-4 (which may be referred to collectively as channels 620). Although FIG. 6 shows four channels and eight flash memory chips, embodiments of the disclosure may include any number (one or more, without bound) of channels including any number (one or more, without bound) of flash memory chips.

Within each flash memory chip, the space may be organized into blocks, which may be further subdivided into pages, and which may be grouped into superblocks. Page sizes may vary as desired: for example, a page may be 4 KB of data. If less than a full page is to be written, the excess space is "unused". Blocks may contain any number of pages: for example, 128 or 256. And superblocks may contain any number of blocks. A flash memory chip might not organize data into superblocks, but only blocks and pages.

While pages may be written and read, SSDs typically do not permit data to be overwritten: that is, existing data may be not be replaced "in place" with new data. Instead, when data is to be updated, the new data is written to a new page on the SSD, and the original page is invalidated (marked ready for erasure). Thus, SSD pages typically have one of three states: free (ready to be written), valid (containing valid data), and invalid (no longer containing valid data, but not usable until erased) (the exact names for these states may vary).

But while pages may be written and read individually, the block is the basic unit of data that may be erased. That is, pages are not erased individually: all the pages in a block are typically erased at the same time. For example, if a block contains 256 pages, then all 256 pages in a block are erased at the same time. This arrangement may lead to some management issues for the SSD: if a block is selected for erasure that still contains some valid data, that valid data may need to be copied to a free page elsewhere on the SSD before the block may be erased. (In some embodiments of the disclosure, the unit of erasure may differ from the block: for example, it may be a superblock, which as discussed above may be a set of multiple blocks.)

Because the units at which data is written and data is erased differ (page vs. block), if the SSD waited until a block contained only invalid data before erasing the block, the SSD might run out of available storage space, even though the amount of valid data might be less than the advertised capacity of the SSD. To avoid such a situation, SSD controller 615 may include a garbage collection controller (not shown in FIG. 6). The function of the garbage collection may be to identify blocks that contain all or mostly all invalid pages and free up those blocks so that valid data may be written into them again. But if the block selected for garbage collection includes valid data, that valid data will be erased by the garbage collection logic (since the unit of erasure is the block, not the page). To avoid such data being lost, the garbage collection logic may program the valid data from such blocks into other blocks. Once the data has been programmed into a new block (and the table mapping logical block addresses (LBAs) to physical block addresses (PBAs) updated to reflect the new location of the data), the block may then be erased, returning the state of the pages in the block to a free state.

SSDs also have a finite number of times each cell may be written before cells may not be trusted to retain the data correctly. This number is usually measured as a count of the number of program/erase cycles the cells undergo. Typically, the number of program/erase cycles that a cell may support mean that the SSD will remain reliably functional for a reasonable period of time: for personal users, the user may be more likely to replace the SSD due to insufficient storage capacity than because the number of program/erase cycles has been exceeded. But in enterprise environments, where data may be written and erased more frequently, the risk of cells exceeding their program/erase cycle count may be more significant.

To help offset this risk, SSD controller 615 may employ a wear leveling controller (not shown in FIG. 6). Wear leveling may involve selecting data blocks to program data based on the blocks' program/erase cycle counts. By selecting blocks with a lower program/erase cycle count to program new data, the SSD may be able to avoid increasing the program/erase cycle count for some blocks beyond their point of reliable operation. By keeping the wear level of each block as close as possible, the SSD may remain reliable for a longer period of time.

SSD controller 615 may include flash translation layer (FTL) 630 (which may be termed more generally a translation layer, for storage devices that do not use flash storage), command router 405, computational storage unit 135, and memory 415. FTL 630 may handle translation of LBAs or other logical IDs (as used by processor 110 of FIG. 1) and physical block addresses (PBAs) or other physical addresses where data is stored in flash chips 625-1 through 625-8. FTL 630, may also be responsible for relocating data from one PBA to another, as may occur when performing garbage collection and/or wear leveling. Command router 405, computational storage unit 135, and memory 415 may be as discussed above with reference to FIGS. 1-4B. Note that in some embodiments of the disclosure, such as those described with reference to FIG. 4B above, command router 405 may be implemented using other hardware in controller 615 rather than being a separate module or circuit.

Figure 7:
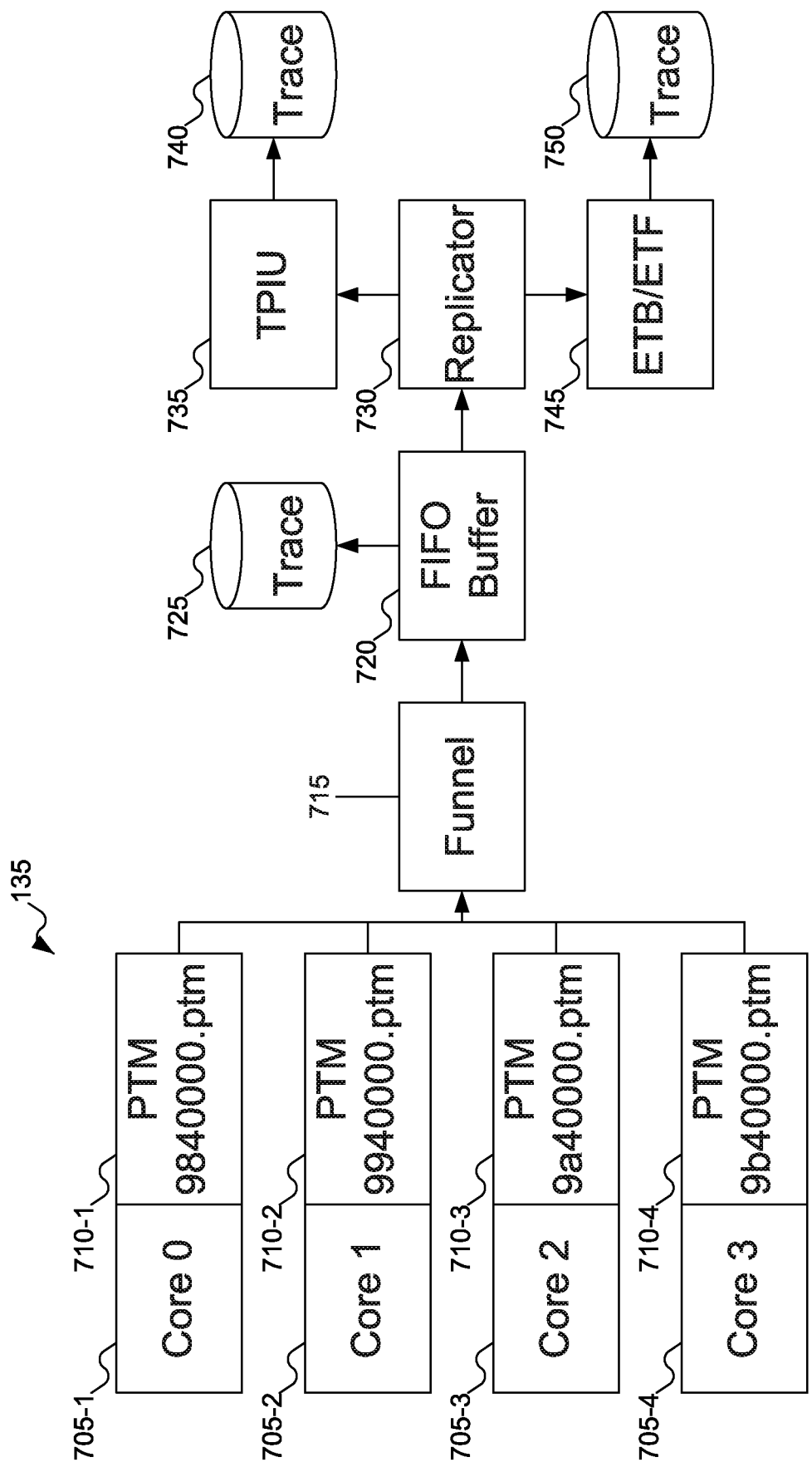
FIG. 7 shows generating a trace in multiple cores in the computational storage unit of FIG. 1, according to embodiments of the disclosure.

FIG. 7 shows generating a trace in multiple cores in computational storage unit 135 of FIG. 1, according to embodiments of the disclosure. In FIG. 7, computational storage unit 135 may include multiple cores 705-1 through 705-4 (which may be referred to collectively as cores 705). FIG. 7 shows computational storage unit 135 as including four cores 705, but embodiments of the disclosure may have computational storage unit 135 including any number (one or more) of cores 705.

Each core 705 may include a program trace microcell (PTM), shown as PTMs 710-1 through 710-4 (and which may be referred to collectively as PTMs 710). By writing to particular PTMs 710, tracing features of cores 705 may be enabled or disabled. Thus, for example, if the user is interested in a trace on cores 705-1 and 705-4, PTMs 710-1 and 710-4 may be enabled, and PTMs 710-2 and 710-3 may be disabled. Note that each PTM 710 may be identified using a different number, enabling the use of individual PTMs.

As traces are generated, information may be provided to funnel 715, which may collect information from PTMs 710s. This information may then be passed to first in, first out (FIFO) buffer 720. A copy of the trace information may be stored in internal memory as trace 725. The information may also be passed to replicator 730, which may send copies of the data to trace port interface unit 735, which may save trace 740 in an external capture device, and to embedded trace buffer/embedded trace FIFO (ETB/ETF) 745, which may save trace 750 in memory 415 of FIG. 4 of computational storage engine 135.

PTMs 710 may represent sources of information, such as the trace described in the example of FIG. 7. In a similar manner, a sink for the information may be specified, identifying where the trace should be saved. Thus, for example, ETB/ETF 745 may be identified as a sink for the trace. In a similar manner, TPIU 735 and/or FIFO buffer 720 may be identified as sinks for the trace.

As discussed above, some embodiments of the disclosure may use an NVMe set feature command to represent computational storage unit command 525 of FIG. 5. For features that may represent computational storage unit commands 525 of FIG. 5, the feature may include any desired information that may be passed to computational storage unit 135. For example, the NVMe set feature command may include a feature identifier in command double word (CDW) 10 (for example, the least significant 8 bits may be used to identify the feature), and may include feature specific information in CDW 11. This feature specific information may be, for example, a value where various bits may be used to enable or disable various features in computational storage unit 135. For a trace, some bits may represent sources (which may be enabled or disabled), and other bits may represent sinks (which may be enabled or disabled). For example, the value 0x10F may indicate that PTMs 710-1 through 710-4 of FIG. 7 may be enabled (as hexadecimal F is binary 1111), and sink 0 may be enabled (since hexadecimal 1 is binary 0001). Depending on the features of computational storage unit 135, different values may represent different combinations of features being enabled and/or disabled, and not all bits in the value may be used (some bits may not be needed or may be ignored).

CDW 0 may be used to return the results of an NVMe set feature command.

FIG. 7 also illustrates another benefit of embodiments of the disclosure. When computational storage unit 135 (or other processor) is managed using a terminal interface, each core or other component may be enabled or disabled separately. Thus, one command may be issued to manage core 705-1, another command may be issued to manage core 705-2, another command may be used to manage PTM 710-1, another command may be issued to manage PTM 710-2, and so on. But using embodiments of the disclosure, because different values may represent different services being enabled and/or disabled in computational storage unit 135, using a command like this enables a single command to represent multiple individual instructions for computational storage unit 135. That is, rather than sending separate command to enable PTM 710-1, then to enable PTM 710-2, and so on, a single command using value 0xF may be used to enable PTMs 710-1 through 710-4. Thus, embodiments of the disclosure support enabling and/or disabling multiple services of computational storage unit 135 with one command.

While the above example describes how tracing may be enabled and/or disabled in computational storage unit 135, embodiments of the disclosure may be used for other commands as well. For example, cores 705 may be selectively enabled and/or disabled, CPU frequencies may be changed, error correction may be enabled and/or disabled, etc. using embodiment of the disclosure, simply by using a different feature identifier (or a different command).

Figure 8:
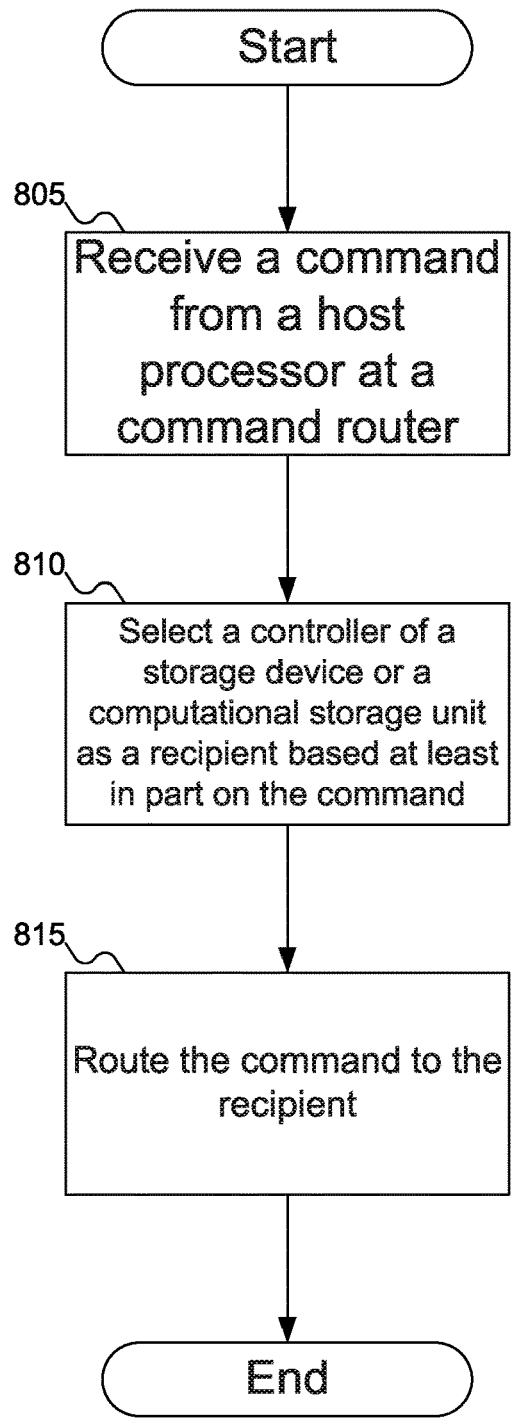
FIG. 8 shows a flowchart of an example procedure to the command router of FIG. 4A route commands to the computational storage unit of FIG. 1, according to embodiments of the disclosure.

FIG. 8 shows a flowchart of a procedure to command router 405 of FIG. 4A route commands to computational storage unit 135 of FIG. 1, according to embodiments of the disclosure. In FIG. 8, at block 805, command router 405 of FIG. 4A may receive command 505 of FIG. 5 from host 105 of FIG. 1. At block 810, command router 405 of FIG. 4A may select a recipient, such as controller 615 of FIG. 6 or computational storage unit 310 of FIG. 3, for command 505 of FIG. 5 based on whether command 505 of FIG. 5 is intended for storage device 120 of FIG. 1 or for computational storage unit 135 of FIG. 1. At block 815, command router 405 of FIG. 4A may route command 505 of FIG. 5 to the recipient.

Figure 9:
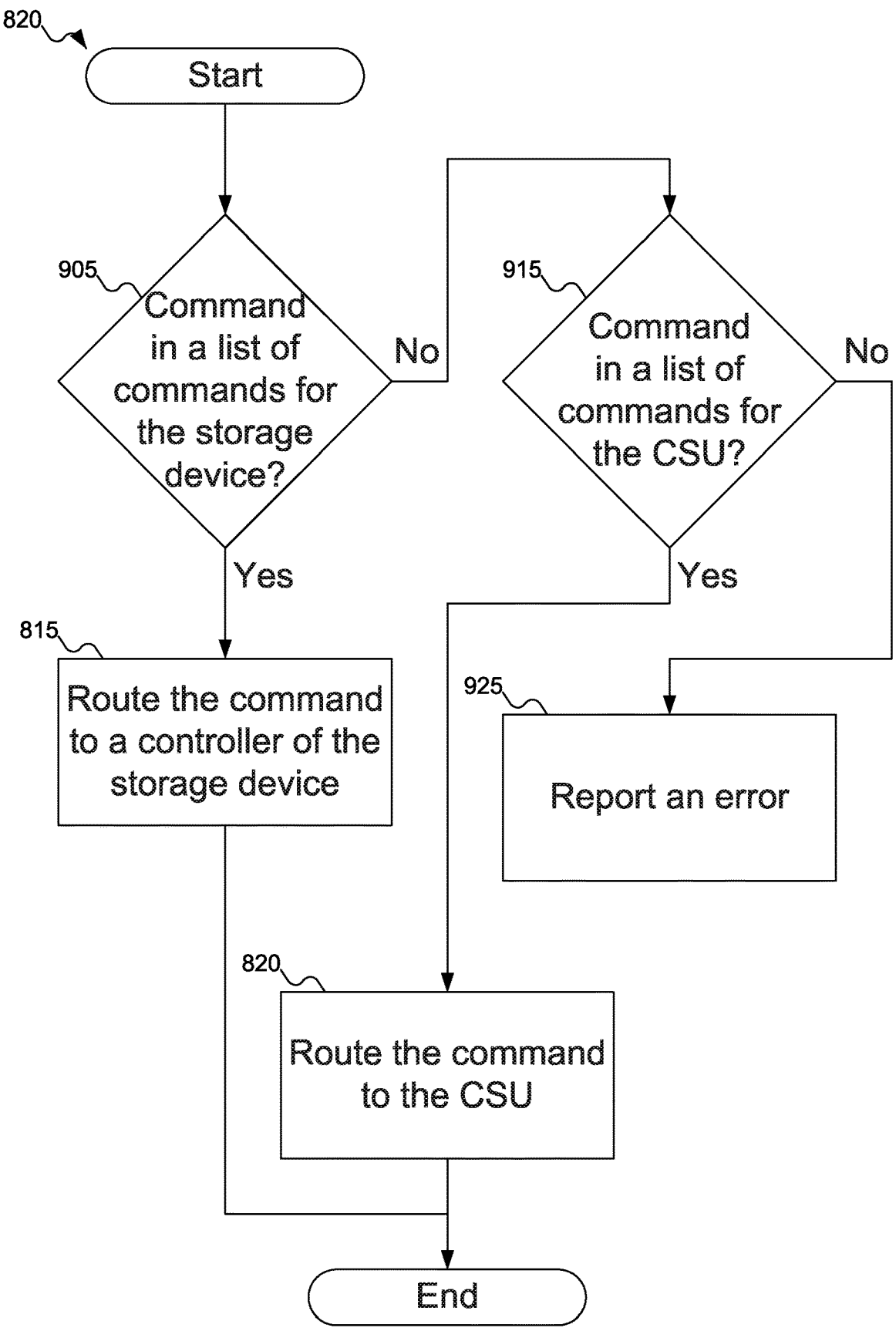
FIG. 9 shows a flowchart of an example procedure to route commands using the command router of FIG. 4A, according to embodiments of the disclosure.

FIG. 9 shows how to route commands using command router 405 of FIG. 4A, according to embodiments of the disclosure. In FIG. 9, at block 905, command router 405 of FIG. 4A may check to see if command 505 of FIG. 5 is in list of storage commands 510 of FIG. 5. If command 505 of FIG. 5 is in list of storage commands 510 of FIG. 5, then storage device 120 of FIG. 1 (or controller 615 of FIG. 6) may be selected as the recipient for command 505 of FIG. 5, and at block 910 command router 405 of FIG. 4A may route command 505 of FIG. 5 to storage device 120 of FIG. 1.

Alternatively, at block 915, command router 405 of FIG. 4A may check to see if command 505 of FIG. 5 is in list of computational storage unit commands 515 of FIG. 5. If command 505 of FIG. 5 is in list of computational storage unit commands 515 of FIG. 5, then computational storage unit 135 of FIG. 1 may be selected as the recipient for command 505 of FIG. 5, and at block 920 command router 405 of FIG. 4A may route command 505 of FIG. 5 to computational storage unit 135 of FIG. 1. Otherwise, if command 505 of FIG. 5 is not in either list of storage commands 510 of FIG. 5 or list of computational storage unit commands 515 of FIG. 5, then at block 925 an error may be reported.

Note that FIG. 9 includes both blocks 905 and 915. In some embodiments of the disclosure, including both of these two checks may redundant: that is, if command 505 of FIG. 5 is not in list of storage commands 510 of FIG. 5, then command 505 of FIG. 5 may be assumed to be in list of computational storage unit commands 515 of FIG. 5, and block 915 may be omitted. The same possibility may be considered in reverse: if command 505 of FIG. 5 is not in list of computational storage unit commands 515 of FIG. 5, then command 505 of FIG. 5 may be assumed to be in list of storage commands 510 of FIG. 5, and block 905 may be omitted. But if embodiments of the disclosure may be generalized to support other types of commands intended for other modules reached through storage device 120 of FIG. 1, then both blocks 905 and 915 (and other similar blocks) may be included. Alternatively, both list of storage commands 510 of FIG. 5 and list of computational storage unit commands 515 of FIG. 5 may be checked: if command 505 of FIG. 5 is not in either list, then an error may be returned.

In FIGS. 8-9, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Embodiments of the disclosure may use a universal controlling feature, such as command router 405 of FIG. 4A, for computational storage across multiple components in a computational device for concurrent logging, tracing, and debugging purposes. Embodiments of the disclosure may include a mechanism to extend and overcome the limitations with existing interfaces to communicate with computational device.

Embodiments of the disclosure may allow direct control over the configuration, features, and settings of the computational device hardware by extending the interface existing commands and directly map it to configure features in the computational device.

Embodiments of the disclosure may provide the ability to expand the functionality of the computation device beyond execution programs and generating output. Examples of such functionalities may include configuring the number of supported interrupts in the processor; enable disabling tracing per core or all cores to achieve multi dimension debug (parallel debugging); setting specific options in the processor, such as the debug level or enable/disable error correction control (ECC); and configuring the number of regions for MPU (memory protection unit) in the processor.

The ability to achieve tracing and debugging without physically connecting to the computational device may be useful for data centers and cloud environments where direct access to the devices may not be possible.

Advantages of the present disclose may include exposing the features that are built in the computation device to the host so it may be leveraged and used. Some embodiments of the disclose may include the ability to use and control features in the computation devices when there is no direct access to the device's ports (such as a joint test access group (JTAG)). Some embodiments of the disclose may include the ability to use one interface to pass commands and get results from a Solid State Drive (SSD) and computational device without the need for two different interfaces.

Embodiments of the disclosure, such as command router 405 of FIG. 4A, may allow for direct control of the computation device hardware features and configurations. Embodiments of the disclosure may avoid interactions that may limit between host and the computation device using memory mapped regions as a way to move data to the device, load and execute computation commands, and move result back to the host. Some embodiments of the disclosure may include a mechanism to get debug data or traces on the instructions the computational device is executing. Some embodiments of the disclosure may include a mechanism for multi dimension debug (parallel debugging). Some embodiments of the disclosure may include a mechanism to control and configure the features of the computational device.

The disclosure proposes a mechanism to access computation device (which can be an ARM central processing unit (CPU), graphics processing unit (GPU), neural processing unit (NPU), etc.) features and enable/disable them through a Non-Volatile Memory Express (NVMe) or Compute Express Link (CXL) interface. Some embodiments of the disclosure may include the ability to use one command to enable/disable a feature and check status without the need for multiple commands. Some embodiments of the disclosure may use a command parser/re-router mechanism to check incoming commands and redirect them to either computational device or to storage device.

Some embodiments of the disclosure may include command router 405 of FIG. 4A to enable direct control over the configuration, features, and settings of the computational device hardware by extending the interface existing commands and directly map it to configure features in the computational device. Some embodiments of the disclosure may give the ability to expand the functionality of the computational device beyond execution programs and generating output. For example, some embodiments may configure the number of supported interrupts in the processor.

Some embodiments of the disclosure may enable disable tracing per core or all cores to achieve multi dimension debug (parallel debugging). Some embodiments of the disclosure may include setting specific options in the processor like the debug level or enable/disable ECC.

Some embodiments of the disclosure may include configuring the number of regions in a memory protection unit (MPU) in the processor to protect memory regions by defining different access permissions in privileged and unprivileged access levels.

Some embodiments of the disclosure may include computational storage devices where the computational device does not have an interface that the host may use to fine tune the capabilities of the computational device.

Some embodiments of the disclosure may include an existing SET feature command which may be used to enable disable the new features and its arguments for the computational device without introducing new command for each feature. Command Double Word (CDW) 10 may include a feature identifier, with bits 0-7 specifying the feature, and CDW 11 may include feature specific information. The rest of command fields may be reserved. Command results may be returned in CDW 0.

Some embodiments of the disclosure may include reserved fields 19h-77h, which may be used to enable/disable ARM debug/traces features or other features.

A storage module, such as storage module 410 of FIG. 4B, may reroute the command based on the feature identifier. If the command includes a storage device NVMe command, the storage module may process the command just like any typical NVMe command. If the command is not identified as an NVMe storage command and the command is in the list of the computational device commands, the storage module may reroute the command to the computational device.

Embodiments of the disclosure may overcome the shortcoming of an NVMe/CXL interface that may prevent the host processor from communicating directly with the computational device.

Some embodiments of the disclosure may provide a mechanism to enable/disable features related to any computational device to which a user has no direct access to the device.

Vendor specific features may be added to the features list.

Some embodiments of the disclosure may utilize and leverage existing debugging/tracing and profiling tools the computational device provides without the need to re-implement these tools.

Some embodiments of the disclosure may provide a mechanism to use one command to enable/disable a feature and check status without the need for multiple commands.

Embodiments of the disclosure may introduce a new feature that acts as a command parser/re-router, such as command router 405 of FIG. 4A, to check incoming commands and redirect them to either computational device or to storage device.

Some embodiments of the disclosure may include a mechanism to access, configure and trigger computational device features through NVMe/CXL interface or any other interface that is lacking this ability.

Some embodiments of the disclosure may include an ability to use one command to enable/disable features and check status without the need for multiple commands.

Some embodiments of the disclosure may include a multi-components computational storage device internal architecture to check incoming commands and redirect them to either computational device or to storage device. A first option may be to use a command parser/re-router to identify incoming commands and reroute them to the corresponding hardware. A second option may be to use the storage module as a command parser/re-router. For example, a storage device receives the command (for example, a NVMe command). If the command is a storage device NVMe command, the command may be used as any typical NVMe command. If the command is not identified as an NVMe storage command and the command is in the list of the computational device commands the storage module reroute the command to the computational device.

Some embodiments of the disclosure may set the command parser job to identify the commands and reroute it to the corresponding hardware. For example, if a command is an NVMe storage command the command parser may reroute it to the storage device; if the command is a debugging tracing command the command parser may reroute it to the computational device.

Some embodiments of the disclosure may include the command parsing inside the storage device (for example, an SSD). Other embodiments of the disclosure may have the command parsing outside the storage device. By determining the hardware to which the command belongs, the command may be "re-routed" to the corresponding hardware.

Some embodiments of the disclosure may include commands descriptors to generate certain data patterns, while other embodiments of the disclosure may focus on rerouting commands to the appropriate hardware (storage device or computational device) based on the command in a computational device environment where commands can target storage or can be intended to trigger certain actions in the computational device.

Some embodiments of the disclosure may include names based on the Linux Open Firmware layer naming convention, which follows the base physical address of the device followed by the device name.

Some embodiments of the disclosure may enable tracing by enabling the trace source(s) and sinks. In some embodiments of the disclosure there may be no limit on the number of sinks (or sources) that may be enabled at any given moment. "Enabling" a source may immediately trigger a trace capture; "disabling" a source may immediately trigger a trace capture.

In some embodiments of the disclosure, each core in a system may be mapped to a companion block called an Embedded Trace Macrocell (ETM). Operating system drivers may program the trace macrocell with specific tracing characteristics. Traces may be generated by the hardware in a format called program flow trace. A program flow trace may include: Some branch instruction; Exceptions; Returns; and/or Memory barriers. In some embodiments of the disclosure, by using the original program image and the traces, it may be possible to reconstruct the path a processor took through the code.

Some embodiments may decode program flow traces using the OpenCSD library (Open CoreSight Decoding library).

Some embodiments of the disclosure may define the on-chip hooks to implement an on-chip instruction and data-access trace facility. Embodiments of the disclosure may have the ability to trace what is done by a CPU core without impact on its performance. The CPU core may have no involvement, hence may have no impact on performance. No external hardware may need to be connected. Synchronization of traces from different source may comprise multi-dimensional debugging. In some embodiments of the disclosure, multi-dimensional debugging may be useful for debugging scenarios that may not afford to stop the target for debugging when a condition occurs. Some embodiments may include systems which do not have a JTAG port, or the port is not accessible.

In embodiments of the disclosure herein, problems which may be solved using trace may include Pointer problems; Illegal instructions and data aborts (such as misaligned writes); Code overwrites, such as writes to Flash, unexpected writes to peripheral registers (SFRs), corrupted stack; Out of bounds data; Uninitialized variables and arrays; Slow programs; Stack overflows; Communication protocol and timing issues; code coverage; and times to execute source code.

Embodiments of the disclosure enable determining whether a command sent to a storage device is intended for a storage device or for a computational storage unit. The command may then be routed to the appropriate hardware based on the intended recipient of the command. Some embodiments of the disclosure may perform routing in a command parser (either inside or outside the storage device); other embodiments of the disclosure may perform routing using a logic in the controller of the storage device. Embodiments of the disclosure may also enable representing multiple instructions (that might have to be issued individually using a terminal interface to a computational storage unit) using a single command.

The following discussion is intended to provide a brief, general description of a suitable machine or machines in which certain aspects of the disclosure may be implemented.

The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes a storage device, comprising:
 a storage for a data;
 a controller to process an input/output (I/O) request from a host processor on the data in the storage;
 a computational storage unit to implement at least one service for execution on the data in the storage; and
 a command router to route a command received from the host processor to the controller or the computational storage unit based at least in part on the command.

Statement 2. An embodiment of the disclosure includes the storage device according to statement 1, wherein the command includes at least one of a Non-Volatile Memory Express (NVMe) command, Compute Express Link (CXL) command, or a Peripheral Component Interconnect Express (PCIe) command.

Statement 3. An embodiment of the disclosure includes the storage device according to statement 1, wherein the command includes a vendor-specific command.

Statement 4. An embodiment of the disclosure includes the storage device according to statement 1, wherein the storage device includes a Solid State Drive (SSD).

Statement 5. An embodiment of the disclosure includes the storage device according to statement 1, wherein the controller includes the command router.

Statement 6. An embodiment of the disclosure includes the storage device according to statement 5, wherein the controller includes a logic to implement the command router.

Statement 7. An embodiment of the disclosure includes the storage device according to statement 1, wherein the command router is configured to route the command to the controller based at least in part on the command being a storage device command.

Statement 8. An embodiment of the disclosure includes the storage device according to statement 1, wherein the command router is configured to route the command to the computational storage unit based at least in part on the command being a computational storage unit command.

Statement 9. An embodiment of the disclosure includes the storage device according to statement 1, wherein the command includes at least two services of the computational storage unit.

Statement 10. An embodiment of the disclosure includes the storage device according to statement 1, wherein the command router includes a list of commands to be routed to the computational storage unit.

Statement 11. An embodiment of the disclosure includes the storage device according to statement 1, wherein the command router includes a list of commands to be routed to the controller.

Statement 12. An embodiment of the disclosure includes the storage device according to statement 1, wherein the computational storage unit includes at least one of a central processing unit (CPU), a complex instruction set computer (CISC), a reduced instruction set computer (RISC), a Field Programmable Gate Array (FPGA), an Application-Specific Integrated Circuit (ASIC), a graphics processing unit (GPU), a general purpose GPU (GPGPU), a tensor processing unit TPU), or a neural processing unit (NPU).

Statement 13. An embodiment of the disclosure includes the storage device according to statement 1, wherein the computational storage unit includes a single core.

Statement 14. An embodiment of the disclosure includes the storage device according to statement 1, wherein the computational storage unit includes at least two cores.

Statement 15. An embodiment of the disclosure includes a method, comprising:
 receiving a command from a host processor at a command router;
 selecting a controller of a storage device or a computational storage unit as a recipient based at least in part on the command; and
 routing the command to the recipient.

Statement 16. An embodiment of the disclosure includes the method according to statement 15, wherein the command includes at least one of a Non-Volatile Memory Express (NVMe) command, Compute Express Link (CXL) command, or a Peripheral Component Interconnect Express (PCIe) command.

Statement 17. An embodiment of the disclosure includes the method according to statement 15, wherein the command includes a vendor-specific command.

Statement 18. An embodiment of the disclosure includes the method according to statement 15, wherein the storage device includes a Solid State Drive (SSD).

Statement 19. An embodiment of the disclosure includes the method according to statement 15, wherein the command router is a component of the storage device.

Statement 20. An embodiment of the disclosure includes the method according to statement 15, wherein the controller of the storage device includes the command router.

Statement 21. An embodiment of the disclosure includes the method according to statement 20, wherein the controller includes a logic to implement the command router.

Statement 22. An embodiment of the disclosure includes the method according to statement 15, wherein the command includes at least two services of the computational storage unit.

Statement 23. An embodiment of the disclosure includes the method according to statement 15, wherein selecting a controller of a storage device or a computational storage unit as a recipient based at least in part on the command includes determining, at the command router, whether the command is in a list of commands to be routed to the computational storage unit.

Statement 24. An embodiment of the disclosure includes the method according to statement 15, wherein selecting a controller of a storage device or a computational storage unit as a recipient based at least in part on the command includes determining, at the command router, whether the command is in a list of commands to be routed to the storage device.

Statement 25. An embodiment of the disclosure includes the method according to statement 15, wherein the computational storage unit includes at least one of a central processing unit (CPU), a complex instruction set computer (CISC), a reduced instruction set computer (RISC), a Field Programmable Gate Array (FPGA), an Application-Specific Integrated Circuit (ASIC), a graphics processing unit (GPU), a general purpose GPU (GPGPU), a tensor processing unit TPU), or a neural processing unit (NPU).

Statement 26. An embodiment of the disclosure includes the method according to statement 15, wherein the computational storage unit includes a single core.

Statement 27. An embodiment of the disclosure includes the method according to statement 15, wherein the computational storage unit includes at least two cores.

Statement 28. An embodiment of the disclosure includes an article, comprising a non-transitory storage medium, the non-transitory storage medium having stored thereon instructions that, when executed by a machine, result in:
  receiving a command from a host processor at a command router;
  selecting a controller of a storage device or a computational storage unit as a recipient based at least in part on the command; and
  routing the command to the recipient.

Statement 29. An embodiment of the disclosure includes the article according to statement 28, wherein the command includes at least one of a Non-Volatile Memory Express (NVMe) command, Compute Express Link (CXL) command, or a Peripheral Component Interconnect Express (PCIe) command.

Statement 30. An embodiment of the disclosure includes the article according to statement 28, wherein the command includes a vendor-specific command.

Statement 31. An embodiment of the disclosure includes the article according to statement 28, wherein the storage device includes a Solid State Drive (SSD).

Statement 32. An embodiment of the disclosure includes the article according to statement 28, wherein the command router is a component of the storage device.

Statement 33. An embodiment of the disclosure includes the article according to statement 28, wherein the controller of the storage device includes the command router.

Statement 34. An embodiment of the disclosure includes the article according to statement 33, wherein the controller includes a logic to implement the command router.

Statement 35. An embodiment of the disclosure includes the article according to statement 28, wherein the command includes at least two services of the computational storage unit.

Statement 36. An embodiment of the disclosure includes the article according to statement 28, wherein selecting a controller of a storage device or a computational storage unit as a recipient based at least in part on the command includes determining, at the command router, whether the command is in a list of commands to be routed to the computational storage unit.

Statement 37. An embodiment of the disclosure includes the article according to statement 28, wherein selecting a controller of a storage device or a computational storage unit as a recipient based at least in part on the command includes determining, at the command router, whether the command is in a list of commands to be routed to the storage device.

Statement 38. An embodiment of the disclosure includes the article according to statement 28, wherein the computational storage unit includes at least one of a central processing unit (CPU), a complex instruction set computer (CISC), a reduced instruction set computer (RISC), a Field Programmable Gate Array (FPGA), an Application-Specific Integrated Circuit (ASIC), a graphics processing unit (GPU), a general purpose GPU (GPGPU), a tensor processing unit TPU), or a neural processing unit (NPU).

Statement 39. An embodiment of the disclosure includes the article according to statement 28, wherein the computational storage unit includes a single core.

Statement 40. An embodiment of the disclosure includes the article according to statement 28, wherein the computational storage unit includes at least two cores.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. A storage device, comprising:
  a storage for a data;
  a controller to process an input/output (I/O) request from a host processor on the data in the storage;
  a computational storage unit to implement at least one service for execution on the data in the storage; and
  a command router to route a first storage protocol command received from the host processor to the controller and to route a second storage protocol command received from the host processor to the computational storage unit based at least in part on a feature identifier of the second storage protocol command.

2. A method, comprising:
  receiving a first storage protocol command from a host processor at a command router;
  identifying a controller of a storage device based at least in part on the first storage protocol command;
  routing the first storage protocol command to the controller;
  receiving a second storage protocol command from the host processor at the command router;
  identifying a computational storage unit of a storage device based at least in part on a feature identifier of the second storage protocol command;
  routing the second storage protocol command to the computational storage unit,
  wherein the controller is.

3. An article, comprising a non-transitory storage medium, the non-transitory storage medium having stored thereon instructions that, when executed by a machine, result in:
  receiving a first storage protocol command from a host processor at a command router;
  identifying a controller of a storage device based at least in part on the first storage protocol command;

routing the first storage protocol command to the controller;

receiving a second storage protocol command from the host processor at the command router;

identifying a computational storage unit of a storage device based at least in part on a feature identifier of the second storage protocol command;

routing the second storage protocol command to the computational storage unit, wherein the controller is.

4. The storage device according to claim 1, wherein the storage device includes a Solid State Drive (SSD).

5. The storage device according to claim 1, wherein the command router is configured to route the first storage protocol command to the controller based at least in part on the first storage protocol command including a storage device command identifier.

6. The storage device according to claim 1, wherein the command router is configured to route the second storage protocol command to the computational storage unit based at least in part on the feature identifier of the second storage protocol command including a computational storage unit command identifier.

7. The storage device according to claim 1, wherein the second storage protocol command includes at least two services of the computational storage unit.

8. The storage device according to claim 1, wherein the command router includes a list of storage device command identifiers to be routed to the controller.

9. The storage device according to claim 1, wherein the computational storage unit includes at least two cores.

10. The storage device according to claim 1, wherein the controller is separate from the command router.

11. The storage device according to claim 1, wherein the second storage protocol command includes a trace command.

12. The storage device according to claim 1, wherein the feature identifier includes the feature identifier of a storage protocol.

13. The method according to claim 2, wherein the second storage protocol command includes at least one of a Non-Volatile Memory Express (NVMe) command, Compute Express Link (CXL) command, or a Peripheral Component Interconnect Express (PCIe) command.

14. The method according to claim 2, wherein the second storage protocol command includes at least two services of the computational storage unit.

15. The method according to claim 2, wherein identifying the controller of the storage device based at least in part on the first storage protocol command includes determining, at the command router, that the first storage protocol command identifier is in a list of command identifiers to be routed to the storage device.

16. The method according to claim 2, wherein identifying the computational storage unit based at least in part on the feature identifier of the second storage command includes determining, at the command router, that the feature identifier is in a list of feature identifiers to be routed to the computational storage unit.

17. The method according to claim 2, wherein the computational storage unit includes at least two cores.

18. The article according to claim 3, wherein the second storage protocol command includes at least two services of the computational storage unit.

19. The article according to claim 3, wherein identifying the controller of the storage device based at least in part on the first storage protocol command includes determining, at the command router, that the first storage protocol command identifier is in a list of command identifiers to be routed to the storage device.

20. The storage device according to claim 12, wherein the second storage protocol command includes at least one of a Non-Volatile Memory Express (NVMe) command, Compute Express Link (CXL) command, or a Peripheral Component Interconnect Express (PCIe) command.

* * * * *